(12) United States Patent
Schliwa et al.

(10) Patent No.: US 12,540,027 B2
(45) Date of Patent: Feb. 3, 2026

(54) FREIGHT CARRIER INTENDED TO BE RECEIVED IN THE CARGO HOLD OF AN AIRCRAFT, AND SYSTEM COMPRISING FREIGHT CARRIERS AND A RECEIVING PLATFORM

(71) Applicant: Airbus Operations GmbH, Hamburg (DE)

(72) Inventors: Ralf Schliwa, Hamburg (DE); Thomas Grabow, Hamburg (DE); Christian Seibt, Hamburg (DE); Hans-Gerhard Giesa, Hamburg (DE); Jörg Cremers, Hamburg (DE); Hermann Benthien, Hamburg (DE); Konstantin Kallergis, Hamburg (DE); Lars Uwe Hansen, Hamburg (DE); Gunda Hülsen, Hamburg (DE); Dirk Meiranke, Hamburg (DE); Paul Wichtmann, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 476 days.

(21) Appl. No.: 17/919,019

(22) PCT Filed: Apr. 14, 2021

(86) PCT No.: PCT/EP2021/059716
§ 371 (c)(1),
(2) Date: Oct. 14, 2022

(87) PCT Pub. No.: WO2021/209524
PCT Pub. Date: Oct. 21, 2021

(65) Prior Publication Data
US 2023/0234775 A1    Jul. 27, 2023

(30) Foreign Application Priority Data
Apr. 17, 2020 (DE) .......................... 102020110592.4

(51) Int. Cl.
*B65D 88/14* (2006.01)
*B64D 9/00* (2006.01)
(Continued)

(52) U.S. Cl.
CPC ............... *B65D 88/14* (2013.01); *B64D 9/00* (2013.01); *B65D 81/05* (2013.01); *B65D 90/0006* (2013.01)

(58) Field of Classification Search
CPC .... B65D 88/14; B65D 81/05; B65D 90/0006; B64D 9/00
See application file for complete search history.

(56) References Cited

U.S. PATENT DOCUMENTS

| 2,918,183 | A |   | 12/1959 | Petersen et al. |
|---|---|---|---|---|
| 3,872,799 | A | * | 3/1975 | Dousset ............... B61D 45/008 410/125 |

(Continued)

FOREIGN PATENT DOCUMENTS

| DE | 3906379 A1 | 9/1990 |
|---|---|---|
| DE | 102008038637 A1 | 2/2010 |

(Continued)

OTHER PUBLICATIONS

International Search Report and Written Opinion dated Jul. 5, 2021; priority document.
German Search Report dated Oct. 29, 2020; priority document.

*Primary Examiner* — Saul Rodriguez
*Assistant Examiner* — Ashley K Romano
(74) *Attorney, Agent, or Firm* — Greer, Burns & Crain, Ltd.

(57) ABSTRACT

A freight carrier configured to be received in an aircraft cargo hold, a system of one or more such freight carriers and a receiving platform, and a platform, are each provided. The freight carrier includes a floor element having a resting (Continued)

surface configured to lie on a floor surface of a cargo hold of an aircraft. The freight carrier is configured such that its resting surface can be moved over a floor surface in a floor plane. The floor element has a base element having a base surface. The base surface is situated on the base element such that the base surface faces away from the resting surface. The resting surface is provided with an arrangement to allow the freight carrier to be slid over the floor surface. The floor element has a cavity which extends toward the base surface between the front portion and the rear portion.

18 Claims, 12 Drawing Sheets

(51) Int. Cl.
  *B65D 81/05* (2006.01)
  *B65D 90/00* (2006.01)

(56) References Cited

U.S. PATENT DOCUMENTS

| | | | |
|---|---|---|---|
| 4,077,532 A * | 3/1978 | Bryan | B60P 1/02 108/55.3 |
| 4,344,726 A * | 8/1982 | Naffa | B64D 9/00 410/95 |
| 4,446,524 A * | 5/1984 | Wendt | G01M 1/125 701/124 |
| 5,413,410 A | 5/1995 | Mlakar | |
| 5,819,943 A * | 10/1998 | Depuy | B65D 81/05 410/125 |
| 8,807,894 B2 | 8/2014 | Bistuer et al. | |
| 2011/0156910 A1 | 6/2011 | Pieper et al. | |
| 2014/0367220 A1 | 12/2014 | Lange et al. | |
| 2016/0318608 A1 | 11/2016 | Himmelmann | |
| 2017/0096295 A1 * | 4/2017 | Pherson | B65D 90/22 |
| 2017/0361932 A1 | 12/2017 | Gross | |
| 2018/0194470 A1 | 7/2018 | Helou, Jr. | |
| 2019/0135407 A1 | 5/2019 | Gross | |

FOREIGN PATENT DOCUMENTS

| | | |
|---|---|---|
| DE | 102009030703 A1 | 12/2010 |
| DE | 102010024330 A1 | 12/2011 |
| DE | 102014003210 B3 | 5/2015 |
| DE | 102016210856 A1 | 12/2017 |
| EP | 2492217 A1 | 8/2012 |
| EP | 3006329 A1 | 4/2016 |
| EP | 3006341 B1 | 4/2016 |
| JP | 2011116451 A | 6/2011 |
| WO | 9313842 A1 | 7/1993 |
| WO | 2006072268 A1 | 7/2006 |
| WO | 2018132504 A1 | 7/2018 |

* cited by examiner

FREIGHT CARRIER INTENDED TO BE RECEIVED IN THE CARGO HOLD OF AN AIRCRAFT, AND SYSTEM COMPRISING FREIGHT CARRIERS AND A RECEIVING PLATFORM

CROSS-REFERENCES TO RELATED APPLICATIONS

This application claims the benefit of the International Application No. PCT/EP2021/059716, filed on Apr. 14, 2021, and of the German patent application No. 102020110592.4 filed on Apr. 17, 2020, the entire disclosures of which are incorporated herein by way of reference.

FIELD OF THE INVENTION

The present invention relates to a freight carrier intended to be received in the cargo hold of an aircraft, to a system consisting of one or more freight carriers and a receiving platform, and to a receiving platform.

BACKGROUND OF THE INVENTION

It is known from the prior art that the cargo hold of an aircraft is loaded in such a way that individual freight elements are loaded into so-called freight containers made of dimensionally stable material such as aluminum and these freight containers are then conveyed into the cargo hold. On the one hand, this requires a first conveying device, by means of which the freight containers are conveyed to the entrance into the cargo hold. On the other hand, a second conveying device, such as, for example, a conveyor belt arrangement or a roller system, is required within the cargo hold, by way of which the freight containers can be conveyed within the cargo hold on its floor surface from the entrance to the final position.

Both the freight containers themselves and the conveying device within the cargo hold can have a not inconsiderable weight, but it is desirable to keep the weight of an aircraft as low as possible in order to minimize its fuel consumption.

It is known from DE 10 2008 038 637 A1 to provide a freight container with wheels in the region of its floor, which can be moved back and forth between a retracted and an extended position with the aid of an actuating device. A disadvantage of this structure is the mechanically complex structure of the floor region of the freight containers. Furthermore, due to the wheels, the cargo floor may be overloaded at certain points and wear may occur.

EP 3 006 329 B1 and EP 3 006 341 B1 each describe that freight carriers which have a blower unit with which they can be raised relative to the floor surface are slidably mounted on the floor surface of the cargo hold of an aircraft. Freight containers disposed on rails provided on the floor surface can be initially raised by carriers after the latter have been slid under the container. The containers can then be moved using the carriers. To set down the containers, the blower unit of the carriers is then deactivated again and the carriers can be pulled out from under the moved container, since the latter is again resting on the rails.

In this context, it is also known from EP 2 492 217 A1 to use a container made of textile material, which has planar reinforcement elements, as a freight container. A disadvantage of such a container is that it can only be moved with difficulty even over a flat floor surface of a cargo hold, and therefore conveying devices, which are themselves associated with considerable weight, are still required there as before.

Furthermore, freight carriers with cargo from vehicles or trailers that can be moved across the runway have to be conveyed into the cargo hold of an aircraft, for which purpose conveyor belts that run inclined between a loading position near the runway and the loading hatch are usually used. There is now the problem that the freight carrier has to be moved through the loading hatch at an inclination to the plane of the floor of the cargo hold, with the cross section of the loaded freight carrier being too large when it is brought to the loading hatch at an inclination to be able to pass through the loading hatch.

Another problem that arises due to the inclination of the conveyor belt between the runway and the loading hatch of the cargo hold is that the base surface of the freight carrier on which the cargo rests is inclined during transport by the conveyor belt, which can cause the cargo to slip on the base surface.

SUMMARY OF THE INVENTION

Proceeding from the prior art, it is therefore an object of the present invention to eliminate the aforementioned problems and, in particular, to design the parts which are used to load the cargo hold of an aircraft and which remain in the aircraft during the flight to be as lightweight as possible and still enable comfortable loading.

According to a first aspect of the present invention, this object is achieved by a freight carrier intended to be received in the cargo hold of an aircraft,
- with a floor element which has a resting surface which is designed to rest on a floor surface of a cargo hold of an aircraft,
- wherein the freight carrier is designed to be moved with the resting surface over a floor surface extending in a floor plane,
- wherein the floor element has a base element with a base surface, the base surface being arranged on the base element in such a way that the base surface faces away from the resting surface,
- wherein the resting surface is provided with means which are designed to enable the freight carrier to be slid over the floor surface, and
- wherein the floor element is configured as a rigid floor panel.

With the freight carrier according to the first aspect of the present invention, it is possible in a simple manner to convey cargo into the cargo hold of an aircraft. For this purpose, individual freight elements can first be deposited on the base surface of the base element provided on the floor element. The freight carrier can then first be transported into the vicinity of the aircraft and then with the aid of a conveying device, such as a conveyor belt, into the cargo hold. Inside the cargo hold, the means for enabling the slidability that are provided on the resting surface which faces the floor of the loading compartment then enable the freight carrier to be easily moved over the floor.

These means can preferably be cylindrical rollers which are attached to the resting surface and the axis of rotation of which is parallel to the plane of the floor surface, i.e., the floor plane, and preferably also parallel to the resting surface of the floor element. Furthermore, such rollers can also be held in such a way that the axes of rotation are rotatable about a vertical axis that runs perpendicular to the floor plane and preferably also perpendicular to the resting surface, and therefore the rollers can always be aligned with the direction along which the freight carrier is intended to be moved over the floor surface.

As an alternative to the rollers, freely rotatable balls held on the resting surface are also possible, owing to which it is possible to easily slide the freight carriers over the floor surface and the axis of rotation of which can also be easily aligned such that it corresponds to the direction along which the freight carrier is pushed over the floor surface.

Furthermore, it is also possible for the means for enabling the slidability to have outlet openings in the resting surface, through which air can escape from the resting surface in order to form an air cushion under the resting surface. In this case, a connection on the freight carrier and a connecting arrangement which connects the connection to the outlet openings can be provided. The connection can then be configured to be releasably connected to the output of a blower unit or air source such that an air flow can be generated from the blower unit through the connector and the connecting arrangement toward the outlet openings and out of same. In this way, the air cushion can be created when it is intended to move the freight carrier.

Furthermore, it is also possible for the means for enabling the slidability to comprise sliding elements which are provided on the resting surface and which have a low frictional resistance in relation to the floor surface of the loading compartment and which are attached to the resting surface in such a way that they come into contact with the floor surface when the freight carrier rests on the floor of the cargo hold. This also allows the freight carrier to be easily moved over the floor surface.

The previously mentioned options for designing the means for enabling the slidability represent examples, but are not an exhaustive list, and therefore other designs may also be used.

Finally, in this aspect of the present invention, it is provided that the floor element is configured as a rigid floor panel. The effect achieved by this is that the floor element is not deformed when the freight carrier slides, for example, from the conveyor belt onto the floor of the cargo hold, which could otherwise result in cargo slipping on the base surface of the base element. With this configuration, cargo can thus be conveyed into the cargo hold in a particularly safe manner.

Furthermore, the above object is achieved according to a second aspect of the present invention by a freight carrier intended to be received in the cargo hold of an aircraft,
    with a floor element which has a resting surface which is designed to rest on a floor surface of a cargo hold of an aircraft,
    wherein the freight carrier is designed to be moved with the resting surface over a floor surface extending in a floor plane,
    wherein the floor element has a base element with a base surface, the base surface being arranged on the base element in such a way that the base surface faces away from the resting surface,
    wherein the resting surface is provided with means which are designed to enable the freight carrier to be slid over the floor surface, and
    wherein the floor element is configured as a flexible, in particular bendable, floor panel.

This structure of a freight carrier can also be used in the manner described in connection with the first aspect, and cargo can be deposited on the base surface and the freight carrier can then be brought into the vicinity of the aircraft, from where it is then conveyed into the cargo hold, for example by means of a conveyor belt.

Furthermore, in this aspect of the present invention, the means for enabling the slidability can be designed in the same way as has already been explained in connection with the first aspect.

Finally, in the case of the freight carrier according to the second aspect of the present invention, it is indeed necessary for the floor element to be stabilized during transport of the freight carrier, for example by means of a hoist, so that the floor element does not become deformed due to a lack of support. However, on the other hand, the bendable, flexible design of the floor element allows the freight carrier to be able to deform or bend, for example at the transition between the conveyor belt and the floor of the loading compartment, and thus be easily moved into the loading compartment. In particular, this makes it possible for the minimum size that the loading hatch must have for freight carriers of a certain maximum height to be reduced, since the freight carrier with the forward section inclined rearward and upward does not strike against the loading hatch.

The above object is also achieved according to a third aspect of the present invention by a freight carrier intended to be received in the cargo hold of an aircraft,
    with a floor element which has a resting surface which is designed to rest on a floor surface of a cargo hold of an aircraft,
    wherein the freight carrier is designed to be moved with the resting surface over a floor surface extending in a floor plane,
    wherein the floor element has a base element with a base surface, the base surface being arranged on the base element in such a way that the base surface faces away from the resting surface,
    wherein the resting surface is provided with means which are designed to enable the freight carrier to be slid over the floor surface,
    wherein the floor element has a multiplicity of pivotably interconnected segments.

The structure of a freight carrier according to the third aspect can also be used in the manner described in connection with the first and second aspects, and cargo can be deposited on the base surface of the base element of the freight carrier and the freight carrier can then be brought into the vicinity of the aircraft, from where it is then conveyed into the cargo hold, for example by means of a conveyor belt.

In this third aspect of the present invention, the means for enabling the slidability can also be designed in the same way as has already been explained in connection with the first and second aspects.

The floor element constructed by segments that are interconnected pivotably also means that the freight carrier is pushed over bumps in the floor surface of the cargo hold more easily, and the floor element is nevertheless comparatively stable. In a preferred embodiment of this aspect, the pivot axes about which the segments are pivotable relative to one another run parallel to one another. The effect achieved by this is that when the freight carrier is conveyed into the cargo hold by means of a conveyor belt and the pivot axes are aligned perpendicular to the direction of transport, the transition between the conveyor belt and the floor of the cargo hold can be passed over without the entire freight carrier suddenly being able to tip over.

In a preferred embodiment of the first and second aspects of the present invention, the floor element has a front edge and a rear edge, wherein the resting surface has a front section and a rear section, wherein the front section is arranged in the region of the front edge and the rear section is arranged in the region of the rear edge, and wherein the floor element has a recess which extends between the front section and the rear section toward the base surface. In particular, the recess can be configured in such a way that it extends through the resting surface and the latter is interrupted in the region of the recess.

The effect achieved with this structure is that the freight carrier, when it is first conveyed to the cargo hold in a manner resting on a conveyor belt that is inclined toward the floor of the cargo hold of the aircraft, does not suddenly tip out of the plane of the conveyor belt into the plane of the floor of the cargo hold. Rather, in the transition of the freight carrier from the conveyor belt to the floor of the cargo hold, the front section can promptly rest on the floor of the cargo hold while the rear section is still resting on the conveyor belt, this being made possible by the upper end of the conveyor belt being received in the recess.

Furthermore, in a preferred embodiment of all aspects of the present invention, the freight carrier is designed in such a way that the base element is fixedly connected to the floor element, and, in particular, is formed integrally with the floor element. As a result, a particularly simple structure of the freight carrier is realized.

In a further embodiment of the aspects of the present invention, the resting surface has a front edge and a rear edge, wherein the base element is held on the floor element in such a way that it is possible to change the angle which the base surface assumes relative to the resting surface in a plane which runs perpendicularly to the resting surface and in which a connecting line running in the longitudinal direction of the freight carrier extends between the front edge and the rear edge. This pivotability of the base element and of the associated base surface relative to the floor element can ensure that the base surface always extends in a horizontal plane, regardless of the inclination of the floor on which the resting surface rests. In particular, if the freight carrier is transported on an inclined conveyor belt and the transport direction coincides with the connecting line between the front and rear edges, the inclination can be easily compensated for in this way, and cargo on the freight carrier is prevented from slipping due to the inclination.

In one embodiment of all aspects of the present invention, this adjustability of the inclination of the base surface relative to the base element can be realized in a simple manner by the fact that the base element is pivotable about a pivot axis relative to the floor element, wherein the pivot axis is perpendicular to the connecting line and parallel to the resting surface.

In a particularly preferred embodiment of the aspects of the present invention, the floor element has a front edge and a rear edge, the floor element having a forward section and a rearward section. The forward section is arranged in the region of the front edge and the rearward section is arranged in the region of the rear edge, wherein the rearward section of the floor element is connected to the base element via a lever arm, the lever arm being coupled pivotably to the base element and pivotably to the floor element, and wherein the forward section is held on the floor element so as to be able to be slid in the longitudinal direction of the floor element and on the base element so as to be pivotable. Preferably, the pivot axes about which the lever arm can pivot relative to the rearward section of the floor element and relative to the base element, and the pivot axis about which the forward section can pivot relative to the base element, are all parallel to one another and also extend perpendicular to the longitudinal direction.

In this embodiment, the base element, on the base surface of which the cargo can be disposed, can be pivoted in a simple manner relative to the floor element by the forward section of the base element being slid toward the lever arm.

In a further preferred embodiment of the aspects of the present invention, the freight carrier can have a receiving space extending away from the base surface, wherein planar separating elements which divide the receiving space into subsections and extend away from the base surface are provided within the receiving space. This prevents cargo inside the receiving space from being able to slip.

According to a further embodiment of the aspects of the present invention, the freight carrier can have a front wall, a rear wall and side walls extending between the front wall and the rear wall, wherein connecting elements for the releasable connection to another freight carrier are provided in the region of the side walls and/or in the region of the front wall and rear wall. This makes it possible to couple a plurality of freight carriers to one another in order to prevent the freight carriers from moving independently of one another in the cargo hold of an aircraft, for example during flight.

Finally, it has proven to be advantageous in connection with the present invention if the freight carriers according to the aspects of the present invention have receiving elements, preferably shafts, for receiving the forks of a forklift truck, since the freight carriers can then be transported easily.

Furthermore, in a preferred embodiment of the aspects of the present invention, it is also possible for the freight carrier according to the invention to be designed to receive one or more wheelchairs. In particular, the area of the base surface can be dimensioned in such a way that one or more wheelchairs can be received or deposited on it. For this purpose, the base surface can also have appropriately adapted fastening means such as belts for wheelchairs.

In particular, the freight carrier can have a front wall, a rear wall and side walls extending between the front wall and the rear wall, which walls are designed to be rigid and dimensionally stable so that wheelchairs received in the receiving space of the freight carrier are not damaged. Furthermore, the front wall, the rear wall and/or the side wall can be formed from heat-resistant and/or fire-resistant material so that when battery-powered wheelchairs are being transported and the batteries overheat or catch fire, this cannot spread into the cargo hold.

Furthermore, in one refinement of the freight carrier intended for receiving wheelchairs, it can be provided that expandable elements such as inflatable cushion elements are provided on the front wall, the rear wall and/or the side walls, with which elements the wheelchairs can be fixed in the receiving space or protected against impact.

In addition, it is advantageous in such an embodiment if the freight carrier has data transmission means with which data regarding the contents of the freight carrier, i.e., for example, the number, the type or information individually identifying the wheelchairs received, are able to be transmitted, preferably wirelessly, to a data network of an aircraft.

Furthermore, the above object is achieved by a system with one or more freight carriers according to the previously described embodiments,
    with a receiving platform, wherein the receiving platform has a receiving surface and a floor which is designed to rest on a floor surface of a cargo hold of an aircraft, wherein the receiving surface is dimensioned and designed to receive one or more of the freight carriers by way of the resting surface thereof.

With such a system it is possible to arrange the freight carriers described above on the receiving platform and then to transport the latter with the freight carriers located thereon into the loading compartment of an aircraft. In this case, the receiving platform can be adapted to interact with the cargo loading system of an aircraft such that the receiving platform can be moved together with the cargo loading system in the cargo hold. Through the use of the receiving platform, the freight carriers, which are otherwise designed to be used in cargo holds without a cargo loading system, can also be adapted to other cargo holds.

In a particularly preferred manner, the receiving surface is designed and dimensioned in such a way that two freight carriers can be received next to one another, in particular with their side surfaces lying opposite one another.

Furthermore, it is preferred if the receiving platform is designed in such a way that the receiving surface can be pivoted relative to the floor. This makes it possible to ensure, in particular if the freight carriers themselves do not have any means for pivoting the base surface relative to the floor element, that the base surface of the freight carriers extends in a horizontal plane when they are moved along an inclined path together with the receiving platform.

According to a further aspect of the present invention, a receiving platform for a system as described above is provided, wherein the receiving platform has a receiving surface and a floor which is designed to rest on a floor surface of a cargo hold of an aircraft, and wherein the receiving surface is dimensioned and designed to receive one or more of the freight carriers according to one or more of the previous aspects by way of the resting surface thereof.

In particular, the receiving surface of the receiving platform can be designed and dimensioned in such a way that two freight carriers can be received next to one another, in particular with their side surfaces lying opposite one another.

Finally, the receiving platform can be designed in such a way that the receiving surface can be pivoted relative to the floor.

Furthermore, the following embodiments 1 to 22 are the subject matter of the present invention, with the reference symbols contained therein referring to the drawing described below:

1. A freight carrier intended to be received in the cargo hold (3) of an aircraft (1), with a floor element (9) which has a resting surface (11) which is designed to rest on a floor surface of a cargo hold (3) of an aircraft (1), wherein the freight carrier (7) is designed to be moved with the resting surface (11) over a floor surface extending in a floor plane, wherein the floor element (9) has a base element (12) with a base surface (13), the base surface (13) being arranged on the base element (12) in such a way that the base surface (13) faces away from the resting surface (11), wherein the resting surface (11) is provided with means which are designed to enable the freight carrier (7) to be slid over the floor surface, and wherein the floor element (9) is configured as a rigid floor panel.

2. A freight carrier intended to be received in the cargo hold (3) of an aircraft (1), with a floor element (9) which has a resting surface (11) which is designed to rest on a floor surface of a cargo hold (3) of an aircraft (1), wherein the freight carrier (7) is designed to be moved with the resting surface (11) over a floor surface extending in a floor plane, wherein the floor element (9) has a base element (12) with a base surface (13), the base surface (13) being arranged on the base element (12) in such a way that the base surface (13) faces away from the resting surface (11), wherein the resting surface (11) is provided with means which are designed to enable the freight carrier (7) to be slid over the floor surface, and wherein the floor element (9) is designed as a flexible, in particular bendable, floor panel.

3. A freight carrier intended to be received in the cargo hold (3) of an aircraft (1), with a floor element (9) which has a resting surface (11) which is designed to rest on a floor surface of a cargo hold (3) of an aircraft (1), wherein the freight carrier (7) is designed to be moved with the resting surface (11) over a floor surface extending in a floor plane, wherein the floor element (9) has a base element (12) with a base surface (13), the base surface (13) being arranged on the base element (12) in such a way that the base surface (13) faces away from the resting surface (11), wherein the resting surface (11) is provided with means which are designed to enable the freight carrier (7) to be slid over the floor surface, and wherein the floor element (9) has a multiplicity of pivotably interconnected segments (9', 9'', 9''').

4. The freight carrier according to embodiment 3, wherein the pivot axes (9'''') about which the segments (9', 9'', 9''') are pivotable relative to one another run parallel to one another.

5. The freight carrier according to one of the embodiments 1 or 2, wherein the floor element (9) has a front edge (77) and a rear edge (79), wherein the resting surface (11) has a front section (81) and a rear section (83), wherein the front section (81) is arranged in the region of the front edge (77) and the rear section (83) is arranged in the region of the rear edge (79), and wherein the floor element (9) has a recess (85) which extends between the front section (81) and the rear section (83) toward the base surface (13).

6. The freight carrier according to one or more of the embodiments 1 to 5, wherein the base element (12) is fixedly connected to the floor element (9), in particular is formed integrally with the floor element (9).

7. The freight carrier according to one or more of the embodiments 1 to 5, wherein the resting surface (11) has a front edge (77) and a rear edge (79), wherein the base element (12) is held on the floor element (9) in such a way that it is possible to change the angle which the base surface (13) assumes relative to the resting surface (11) in a plane which runs perpendicularly to the resting surface (11) and in which a connecting line running in the longitudinal direction of the freight carrier (7) extends between the front edge (77) and the rear edge (79).

8. The freight carrier according to embodiment 7, wherein the base element (12) is pivotable about a pivot axis (89) relative to the floor element (9), and wherein the pivot axis (89) is perpendicular to the connecting line and parallel to the resting surface (11).

9. The freight carrier according to embodiment 7, wherein the floor element (9) has a front edge (77) and a rear edge (79), wherein the floor element (9) has a forward section (91) and a rearward section (93), wherein the forward section (91) is arranged in the region of the front edge (77) and the rearward section (93) is arranged in the region of the rear edge (79), wherein the rearward section (93) of the floor element (9) is connected to the base element (12) via a lever arm (95), the lever arm (95) being coupled pivotably to the base element (12) and pivotably to the floor element (9), and wherein the forward section (91) is held on the floor element (9) so as to be able to be slid in the longitudinal direction of the floor element (9) and on the base element (12) so as to be pivotable.

10. The freight carrier according to one or more of the embodiments 1 to 9, wherein the freight carrier (7) has a receiving space (17) extending away from the base surface (13), and wherein planar separating elements (15') which divide the receiving space (17) into subsections and extend away from the base surface (13) are provided within the receiving space (17).

11. The freight carrier according to one or more of the embodiments 1 to 10, wherein the freight carrier (7) has a front wall, a rear wall and side walls extending between the front wall and the rear wall, and wherein connecting elements (37) for the releasable connection to another freight carrier (7) are provided in the region of the side walls and/or in the region of the front wall and rear wall.

12. The freight carrier according to one or more of the embodiments 1 to 11, wherein receiving elements, preferably shafts (99), are provided for receiving the forks of a forklift truck.

13. The freight carrier according to one or more of the embodiments 1 to 12, wherein the freight carrier (7) has a front wall, a rear wall and side walls extending between the front wall and the rear wall, and wherein the front wall, the rear wall and the side walls are designed to be rigid and dimensionally stable.

14. The freight carrier according to embodiment 13, wherein the front wall, the rear wall and/or the side wall are formed from heat-resistant and/or fire-resistant material.

15. The freight carrier according to embodiment 13 or 14, wherein expandable elements such as inflatable cushion elements (105) are provided on the front wall, the rear wall and/or the side walls.

16. The freight carrier according to one or more of the embodiments 1 to 15, wherein the freight carrier (7) is configured to receive one or more wheelchairs (97), wherein the freight carrier has data transmission means (107) with which data regarding wheelchairs (97) received, in particular information identifying the wheelchairs (97) individually, can be transmitted, preferably wirelessly, to a data network of an aircraft (1).

17. A system with one or more freight carriers (7) according to one or more of the embodiments 1 to 16, and with a receiving platform (109), wherein the receiving platform (109) has a receiving surface (111) and a floor (113) which is designed to rest on a floor surface of a cargo hold (3) of an aircraft (1), wherein the receiving surface (111) is dimensioned and designed to receive one or more of the freight carriers (7) by way of the resting surface (11) thereof.

18. The system according to embodiment 17, wherein the receiving surface (111) is designed and dimensioned in such a way that two freight carriers (7) can be received next to one another, in particular with their side surfaces lying opposite one another.

19. The system according to embodiment 17 or 18, wherein the receiving platform (109) is designed in such a way that the receiving surface (111) can be pivoted relative to the floor (113).

20. A receiving platform for a system according to one of the embodiments 17 to 19, wherein the receiving platform (109) has a receiving surface (111) and a floor (113) which is designed to rest on a floor surface of a cargo hold (3) of an aircraft (1), wherein the receiving surface (111) is dimensioned and designed to receive one or more of the freight carriers (7) according to one or more of claims 1 to 9 by way of the resting surface (11) thereof.

21. The receiving platform according to embodiment 21, wherein the receiving surface (111) is designed and dimensioned in such a way that two freight carriers (7) can be received next to one another, in particular with their side surfaces lying opposite one another.

22. The receiving platform according to embodiment 20 or 21, wherein the receiving platform (109) is designed in such a way that the receiving surface (111) can be pivoted relative to the floor (113).

BRIEF DESCRIPTION OF THE DRAWINGS

The present invention will be explained below with reference to a drawing showing merely preferred exemplary embodiments, in which.

DETAILED DESCRIPTION OF THE PREFERRED EMBODIMENTS

Figure 1:
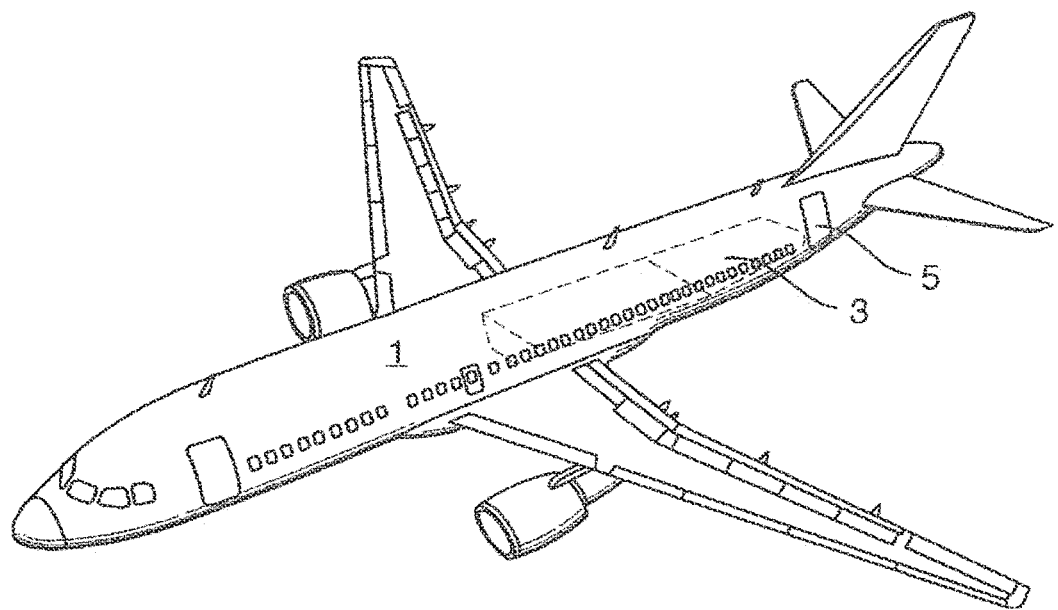
FIG. 1 shows a perspective view of a passenger aircraft, in which the exemplary embodiments of freight carriers according to the invention can be used for loading the cargo hold of the aircraft.

FIG. 1 shows an aircraft 1, the cargo hold 3 of which can be loaded through the loading hatch 5 with freight carriers 7 according to the exemplary embodiments described below.

Figure 2:
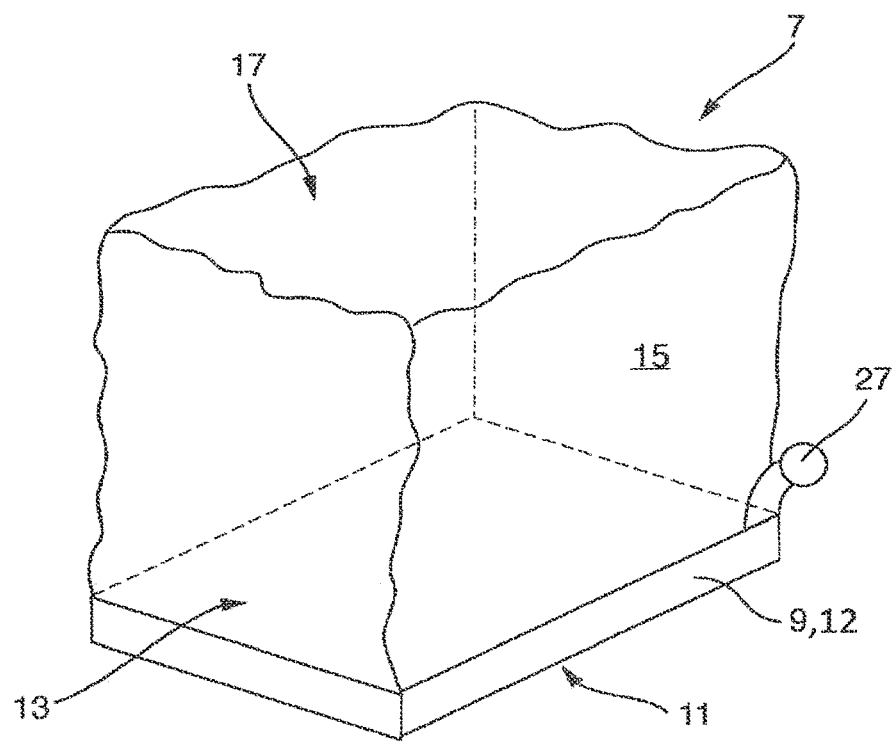
FIG. 2 is a perspective view of a freight carrier of a first exemplary embodiment, in particular for a system according to the invention.

As can be seen in FIG. 2, the freight carrier 7 of the first exemplary embodiment has a floor element 9, which is rectangular here and is configured as a rigid floor panel. The effect achieved by the rigid floor panel is that the floor element 9 is not deformed when the freight carrier 7 slides, for example, from a conveyor belt onto the floor of the cargo hold 3, which could otherwise result in cargo slipping on the base surface of the base element. With this configuration, cargo can thus be conveyed into the cargo hold 3 in a particularly safe manner. In particular, no special measures are required to secure the cargo on the freight carrier to prevent the cargo from moving.

This floor element 9 which is configured as a rigid floor panel in turn has a planar resting surface 11 in the present exemplary embodiment. The resting surface is designed to rest on a floor surface of the cargo hold 3 of the aircraft 1 in such a way that the resting surface 11 can be slid along the floor surface when the resting surface 11 is slightly spaced apart from the floor surface due to an air cushion formed between it and the floor surface. On the side of the floor element 9 facing away from the resting surface 11, in this exemplary embodiment the floor element is formed integrally with a base element 12, which in turn is provided with a base surface 13, which is also flat here and on which a freight element can be received. Even though the base surface 13 is illustrated here as being flat, the invention is not limited to such flat base surfaces 13, but rather the base surface 13 may be curved. According to the invention, however, the base surface 13 is designed in such a way that freight elements can be received on it. In particular, it is conceivable for the base surface 13 to be adapted to a specific type of freight element.

As can also be seen in FIG. 2, the freight carrier 7 of the first exemplary embodiment has a peripheral wall element 15 which extends upward away from the base surface 13. In the exemplary embodiments described here, the wall element 15 is formed from a flexible, planar material and can therefore be folded up and pressed onto the base surface 13, such that the freight carriers 7 then take up a comparatively small volume and can be stored in a space-saving manner when they are not in use.

Since the wall element 15 runs along the edge of the rectangular floor element 9, it delimits a receiving space 17 that extends upward away from the base surface 13 and into which one or more freight elements (not illustrated) can be received by depositing them at least partially onto the base surface 13. Freight elements can in particular be luggage belonging to passengers on the aircraft 1. However, the invention is in no way limited to this, and therefore the term "freight element" within the meaning of the present invention includes any type of cargo which can be transported in an aircraft.

Furthermore, it should be pointed out that, within the scope of the present invention, it is also possible for the wall element 15 to be dispensed with or for it to be formed from a rigid or stiff material. The first case can be particularly advantageous when only one or a few freight elements are to be received on the freight carrier. A wall made of rigid or stiff material is associated with the advantage that the freight elements are held securely inside the receiving space 17 and the dimensions thereof are fixedly predefined.

Since the floor element 9 is configured as a rigid floor panel in this exemplary embodiment of a freight carrier 7, the provision of the wall element 15 may already be sufficient to secure the cargo on the base surface 13.

In addition, according to the invention, the resting surface 11 of the freight carrier 7 is provided with means that are designed to enable the freight carrier 7 to be slid over the floor surface of the cargo hold 3 of an aircraft 1.

Figure 3:
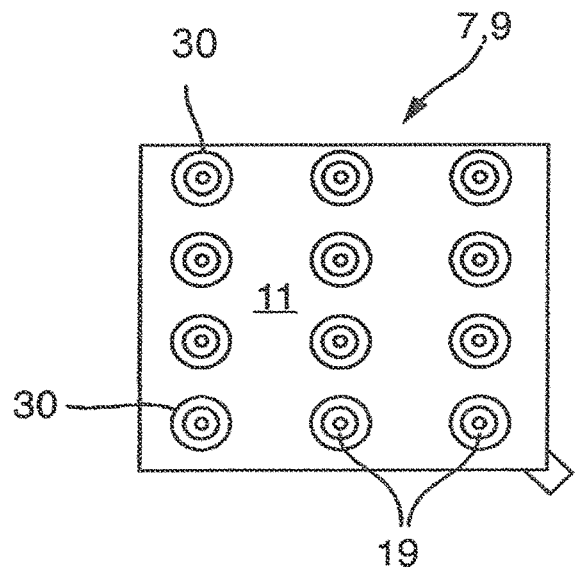
FIG. 3 is a view of the resting surface of the freight carrier from FIG. 2.
Figure 5:
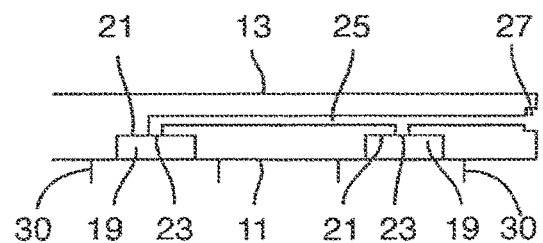
FIG. 5 is a sectional illustration of the floor element of the freight carrier from FIG. 4.

In the first and second exemplary embodiments that are described here of freight carriers 7 which are shown in FIGS. 1 to 7, the means for achieving the slidability are designed in such a manner that recesses 19 which have a base 21 which runs in a plane which is spaced from the plane of the resting surface 11 are formed in the resting surface 11 (see FIGS. 3 and 5). This is not shown in detail for the first exemplary embodiment of a freight carrier 7. However, this structure corresponds to that of the second exemplary embodiment, and the recesses 19 can be seen in the cross-sectional view according to FIG. 5. The base 21 of the recesses 19 is therefore set back toward the base surface 13 in relation to the resting surface 11.

In the first and second exemplary embodiments of freight carriers 7 according to FIGS. 1 to 7, an outlet opening 23 is also provided in the base 21 of each of the recesses 19, through which an air flow can exit and thus initially flow into the recess 19. The outlet openings 23 of the first and second exemplary embodiments are connected via a connecting arrangement, which cannot be seen in FIG. 3 but is shown in FIG. 5, in the form of a line arrangement 25 made up of individual line sections to a connection 27, via which the line arrangement 25 and therefore finally also the outlet openings 23 can be subjected to an air flow. Even if the connecting arrangement which connects the outlet openings 23 and the connection 27 in terms of flow is configured here as a line arrangement 25 with line sections, it is just as possible to provide the floor element 9 with a hollow chamber, which is connected in terms of flow both to the outlet openings 23 and to the connection 27.

As shown in FIGS. 2 and 3, the first exemplary embodiment of a freight carrier 7 is designed in such a way that the connection 27 is spaced apart from the floor element 9 and a line element 29 which extends from the floor element 9 to the connection 27 is provided. The line element 29 can be configured as a flexible hose and connects the connection 27 to the line arrangement 25 provided in the floor element 9.

The connection 27 is configured in such a way that it can be releasably connected to the output of a blower unit, also described below. For this purpose, the connection 27 can have a coupling element which is designed for a releasable connection to a coupling element at the output of the blower unit. The coupling elements at the connection 27 and at the output of the blower unit can form a simple plug-in connection or a bayonet connection. Multiple possibilities are conceivable here. However, it is important that a user can easily connect and disconnect the connection 27 and the output of the blower unit in terms of flow.

Figure 4:
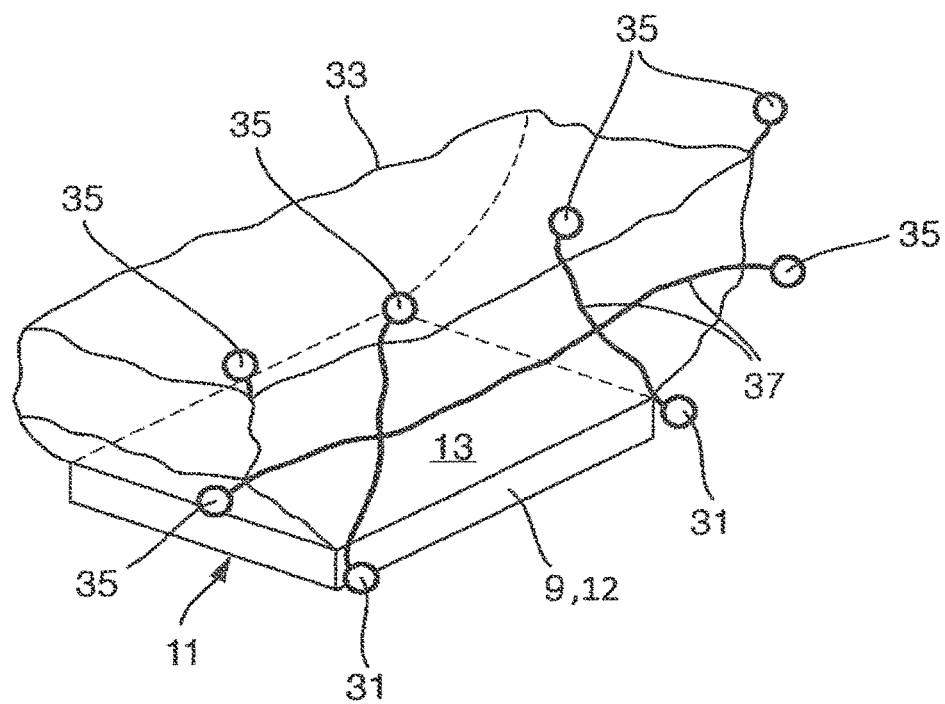
FIG. 4 is a perspective illustration of a freight carrier of a second exemplary embodiment, in particular for a system according to the invention.

The second exemplary embodiment of a freight carrier 7 according to the invention that is illustrated in FIGS. 4 and 5 also has a rigid floor panel as the floor element 9, which floor panel is formed integrally with a base element 12 on the side facing away from the resting surface, which base element in turn has the base surface 13. However, it differs from the freight carrier 7 shown in FIGS. 2 and 3 by the fact that, in the second exemplary embodiment, the connection 27 is provided in the floor element 9 and is not spaced therefrom, for example by a line element. As FIG. 5 shows, the connection 27 in the second exemplary embodiment is designed as a plug-in socket into which the output of the blower unit can be inserted.

It can furthermore be gathered from FIGS. 3 and 5 that the resting surface 11, around the individual outlet openings 23 or recesses 19 in which the outlet openings are arranged, is provided with individual circumferential sealing elements 30 such that each of the recesses 19 is surrounded by a sealing element 30. The effect achieved by this is that an air cushion formed by air escaping from the outlet openings 23 is held under the resting surface 11. Alternatively, it is also possible for the outer edge of the resting surface 11 to be provided with a single circumferential sealing element which encloses the region in which the outlet openings 23 are arranged.

As can also be seen from FIG. 4, in contrast to the first exemplary embodiment, in the second exemplary embodiment, floor holding elements 31 in the form of eyelets are provided in the border region of the floor element 9 and are fastened to the floor element 9.

Even though eyelets are shown here, other elements instead of the eyelets may also be used as floor holding elements. Furthermore, in the region of the wall element 15, on the one hand, wall holding elements 35 are fastened to the peripheral edge 33 remote from the base surface 13 and the floor element 9. Further wall holding elements 35 are fastened to the wall element 15 between the upper peripheral edge 33 and the floor element 9 or the base surface 13. As can also be seen in FIG. 4, the wall holding elements 35 and the floor holding elements 31 are also connected to one another via connecting elements 37 such that the connection between the floor holding elements and wall holding elements 31, 35 is further stabilized.

Figure 6:
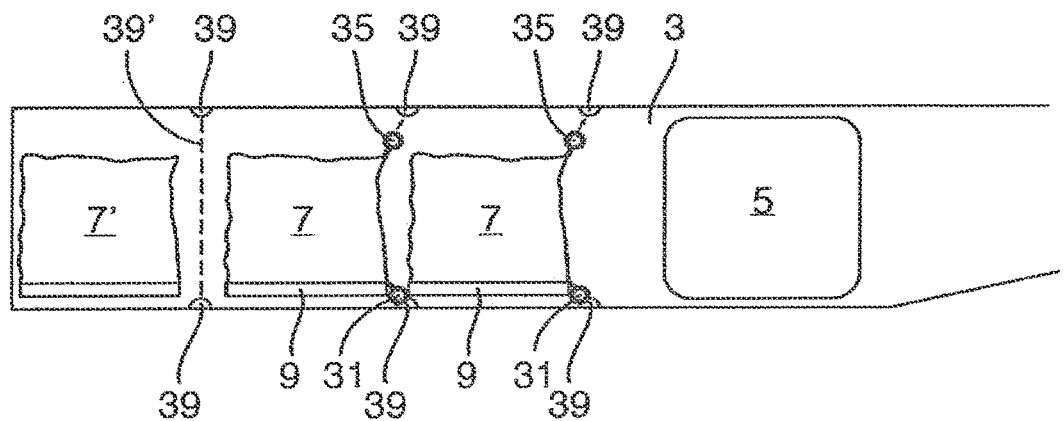
FIG. 6 is a schematic longitudinal sectional illustration through the cargo hold of an aircraft with freight carriers from FIG. 4 received therein.
Figure 7:
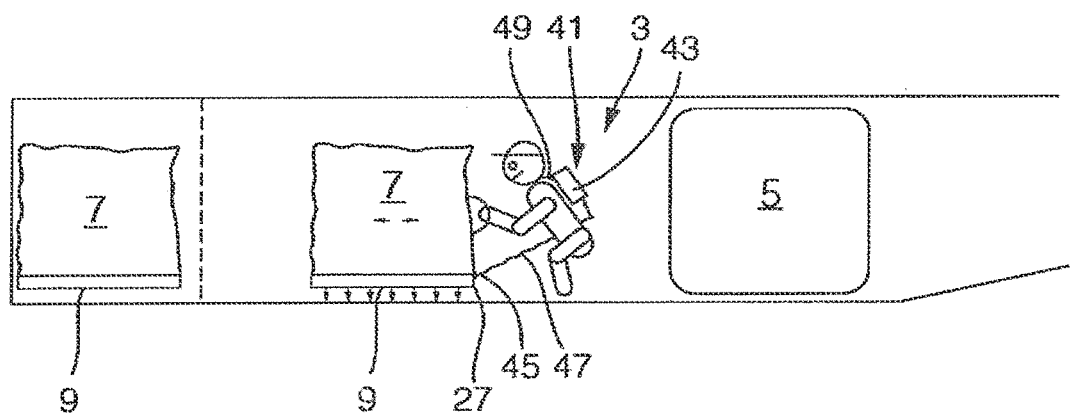
FIG. 7 is a schematic representation of the loading of the cargo hold of an aircraft with the exemplary embodiments of a system according to the invention.

By means of the floor holding elements and wall holding elements 31, 35 fastened directly to the floor element 9 and to the wall element 15, freight carriers 7 of the second exemplary embodiment can be fastened in a simple manner in the cargo hold 3 of an aircraft 1 to holding elements 39 provided there. This is illustrated in FIG. 6, which shows the arrangement of two freight carriers 7 of the second exemplary embodiment together with a conventional freight carrier 7'. It can be seen here that, in the case of the freight carriers 7 of the second exemplary embodiment, the floor holding elements and wall holding elements 31, 35 are in engagement with holding elements 39 which are provided in the cargo hold 3 of the aircraft 1. In contrast thereto, in the case of the conventional freight carrier 7', the latter has to be secured by a separate holding element 39'. The provision of the floor holding elements and wall holding elements 31, 35 on the freight carrier 7 therefore additionally simplifies the securing of the cargo in the cargo hold 3, since a separate holding element is no longer required.

For the first and second exemplary embodiments of freight carriers 7 according to the invention, a blower unit 41 is also provided in a system for loading a cargo hold of an aircraft with at least one freight element, which also forms an aspect of the present invention. The blower unit 41 is shown schematically in FIG. 7 and has a blower 43 and an output 45. The output 45 has a flexible hose 47 which extends away from the blower 43 and can be releasably connected to the connection 27 of the floor element 9 of the freight carrier 7 of the first and second exemplary embodiments. In addition, in the first and second exemplary embodiments described here, a carrying strap arrangement 49 is provided on the blower unit 41 such that a user can carry the blower unit 41 on their back.

During the operation of the blower unit 41, when the blower 43 is working, it generates an air flow at the output 45. Since the output 45 is designed to be releasably connected to the connection 27 of the freight carriers 7, when the freight carriers 7 and blower unit 41 are connected to one another, an air flow from the output 45 into the connection 27 and through the line arrangement 25 to the outlet openings 23 can be generated. If such an air flow is generated with the help of the blower unit 41, an air cushion is generated below the resting surface 11 of the freight carriers 7 according to the first and second exemplary embodiments, the air cushion slightly lifting the freight carrier such that the latter can also be pushed manually over the floor surface of the cargo hold 3 or other surfaces. As a result, the following procedure can be used to load one or more freight elements into the cargo hold 3 of an aircraft:

First, at least one freight element is deposited onto the base surface 13 of the base element 12 of the freight carrier 7 according to the first and second exemplary embodiments, which freight carrier is initially outside the cargo hold. In particular, a multiplicity of freight elements can be deposited on the base surface 13, possibly also one above the other, in the receiving space 17 delimited by the wall element 15.

The output 45 of the blower unit 41 is connected to the connection 27 on the floor element 9 of the freight carrier 7 before or at the latest after the freight element or elements have been deposited on the base surface 13. Since the blower unit 41 has a flexible hose at the output 45, the blower unit 41 can be arranged in a position relative to the floor element 9 that is as easy for the user to carry as possible.

After the freight element or elements has or have been deposited in the receiving space 17, the blower unit 41 is put into operation. This in turn generates an air flow that runs from the blower 43 of the blower unit 41 through the output 45 thereof into the connection 27 of the floor element 9 and from there on through the line arrangement 25 to the outlet openings 23.

This air flow forms an air cushion under the resting surface 11 of the freight carrier 7, which makes it possible to manually move the freight carrier 7 with the freight element or elements without great resistance. In this way, the freight carrier 7 according to the first and second exemplary embodiments can then be pushed by a user, who in the preferred embodiment described here carries the blower unit 41 on their back, over transport planes into the cargo hold 3 and there further over the floor surface thereof into the desired end position.

After the final position in the cargo hold 3 has been reached, the connection 27 to the floor element 9 and the output 45 of the blower unit 41 are disconnected from each other and/or the blower unit 41 is switched off, and therefore the air cushion collapses and the freight carrier 7 stands fixedly on the floor surface of the cargo hold 3. In the case of the freight carriers 7 from the second exemplary embodiment, the floor holding elements and wall holding elements 31, 35 can now be brought into engagement with holding elements 39 in the cargo hold 3 in order to further fix the freight carriers 7 in place.

The user can now move further freight carriers 7 according to the first and second exemplary embodiments into the cargo hold 3 in the manner already described, the user connecting the output 45 of the blower unit 41 to the connection 27 of the freight carrier 7 that has just been moved.

To unload the cargo hold 3, the procedure is reversed, i.e. the blower unit 41 is connected to the connection 27 of the freight carrier 7 to be conveyed out of the cargo hold 3 and an air cushion is built up between the resting surface 11 of the freight carrier and the floor surface of the cargo hold 3 after the blower unit 41 has been put into operation. The freight carrier 7 can then easily be pushed by hand over the floor surface toward the loading hatch 5 of the cargo hold 3 and from there pulled further out of the aircraft 1 via a transport plane.

In an alternative embodiment, the first and second exemplary embodiments of freight carriers according to the invention shown in FIGS. 1 to 7 can be designed in such a way that the floor element 9 is configured as a flexible, in particular bendable, floor panel.

In this alternative embodiment of the present invention, it is indeed necessary for the floor element 9 to be stabilized during the transport of the freight carrier 7, for example by a hoist, so that the floor element 9 does not deform due to its flexibility and a lack of support. However, on the other hand, the bendable, flexible design of the floor element 9 allows the freight carrier to be able to deform or bend, for example at the transition between the conveyor belt and the floor of the loading compartment, and thus be easily moved into the loading compartment.

In particular, this makes it possible for the minimum size that the loading hatch must have for freight carriers 7 of a certain maximum height to be reduced, since the freight carrier 7 with the forward section inclined rearward and upward does not strike against the loading hatch. Rather, it bends downward with the forward end owing to the flexibility of the floor element 9 such that the height of the loading hatch required for the freight carrier is reduced compared to the case in which the floor element 9 is rigid.

Figure 8:
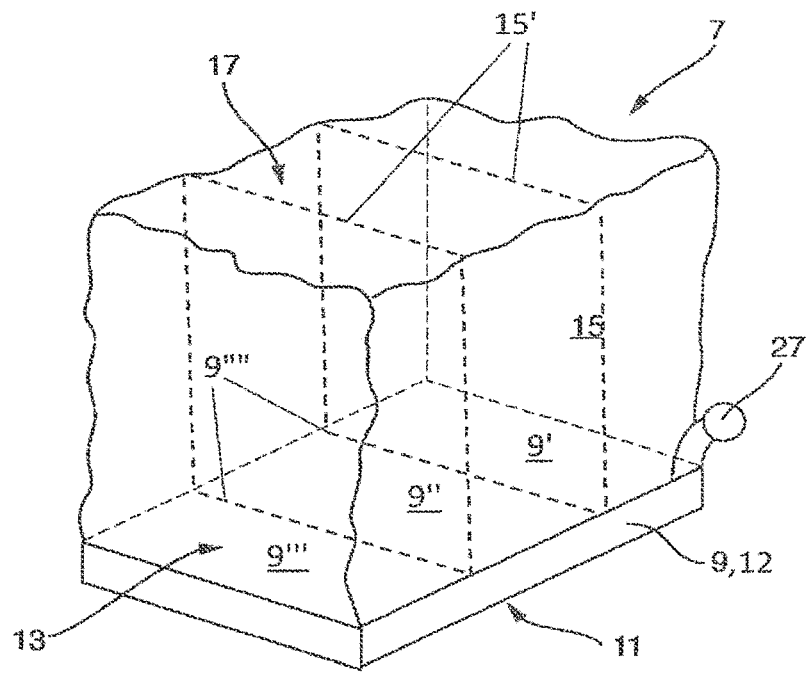
FIG. 8 is a perspective view of a modification of the freight carriers according to the first and second exemplary embodiments, in particular for a system according to the invention.

A further modification of the freight carriers 7 according to the first and second exemplary embodiments is illustrated schematically as a third exemplary embodiment in FIG. 8.

It can be seen in FIG. 8 that, in this modification, the floor element 9, which is also formed integrally with the base element 12, has segments 9', 9", 9''' which are interconnected pivotably along the separating joints 9'''' between the segments. The separating joints 9'''' and thus the pivot axes about which the segments 9', 9", 9''' can pivot relative to one another run parallel to one another in the third exemplary embodiment shown here. However, it is also conceivable that the pivot axes about which the segments 9', 9", 9''' can pivot relative to one another do not run parallel to one another.

The effect achieved by the floor element 9 constructed by segments 9', 9", 9''' that are interconnected pivotably and the base element 12 constructed in the same way is that the freight carrier 7 can be pushed over bumps in the floor surface of the cargo hold 3 more easily, and the floor element 9 is nevertheless comparatively stable. The pivot axes about which the segments 9', 9", 9''' are pivotable relative to one another run parallel to one another in a preferred manner. The effect achieved by this is that when the freight carrier 7 is conveyed into the cargo hold 3 by means of a conveyor belt and the pivot axes are aligned perpendicular to the direction of transport, the transition between the conveyor belt and the floor of the cargo hold 3 can be passed over without the entire freight carrier 7 suddenly being able to tip over.

In the exemplary embodiment shown in FIG. 8, it is also provided that planar separating elements 15' are provided in the receiving space 17 extending away from the base surface 13, which separating elements divide the receiving space 17 into subsections and extend away from the base surface 13. The separating elements 15' prevent freight elements from being able to slip while the aircraft is being loaded and the freight carriers 7 are being transported. This is advantageous in particular when the floor element is segmented.

Figure 9:
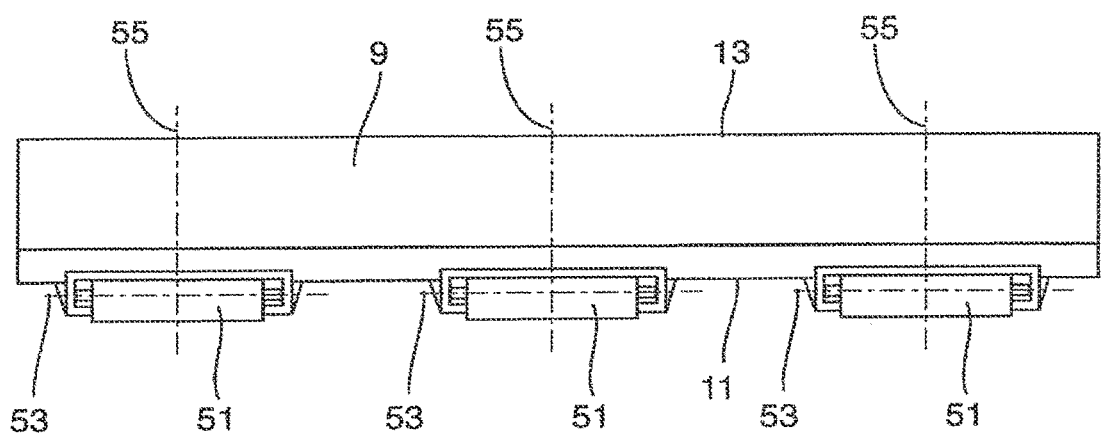
FIG. 9 is a cross-sectional view of the floor element of a freight carrier of a further exemplary embodiment.
Figure 10:
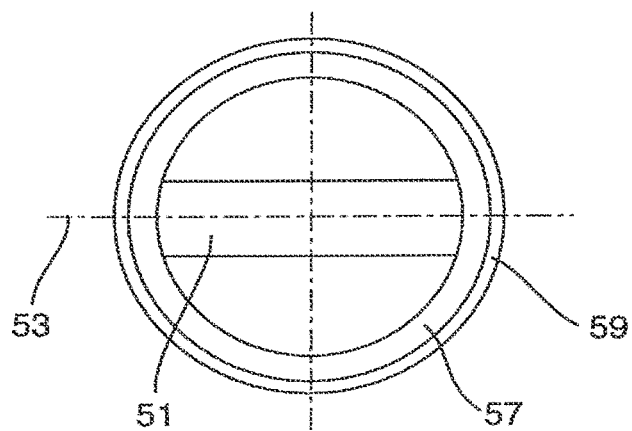
FIG. 10 shows a plan view of a section of the resting surface of the floor element of the exemplary embodiment from FIG. 9.
Figure 11:
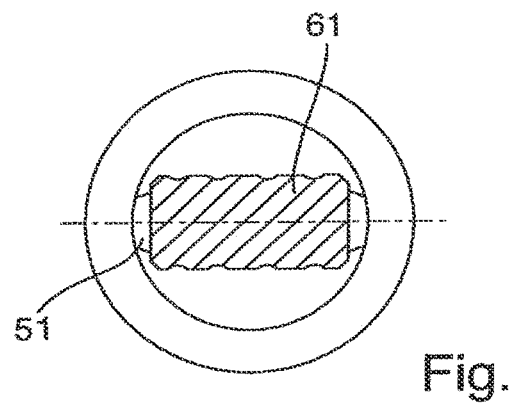
FIG. 11 shows a plan view of a section of the resting surface of an alternative to the floor element of the exemplary embodiment from FIG. 9.

As an alternative to the arrangement with recesses 19 from which air can flow out, FIGS. 9 to 11 show that a multiplicity of rolling elements can also be used as the means for achieving the slidability on the floor of the cargo hold 3, the rolling elements being configured in this preferred exemplary embodiment as cylindrical rollers 51. This alternative can be used in all of the previously described exemplary embodiments of freight carriers 7.

Each of the rollers 51 is initially rotatable about an axis of rotation 53 relative to the floor element 9, the axis of rotation 53 being aligned in such a way that it runs parallel to an axis which, at a contact point in which the roller 51 rests on the floor surface on which the freight carrier 7 rests, extends parallel to the floor surface. If the floor surface is flat and not curved in the region in which the freight carrier 7 rests on it, the axis of rotation 53 runs parallel to the plane of the floor surface and thus to the floor plane of the floor surface.

Furthermore, the rollers 51 are held on the floor element 9 in such a way that the axis of rotation 53 of each of the rollers 51 can rotate about a vertical axis 55, with an axis which extends parallel to the vertical axis 55 and runs through the contact point between the roller 51 and the floor surface, also running perpendicular to the floor plane. In the case of the rollers 51, the vertical axis 55 always runs perpendicularly to the axis of rotation 53 of the rollers 51 and also perpendicularly to the plane of the floor surface in which it extends in the region in which the freight carrier 7 rests on it.

In the alternative shown in FIGS. 9 and 10, the rotatability of the rollers 51 about the vertical axis 55 is realized in such a way that the rollers 51 are held rotatably about the axis of rotation 53 in a holder 57, as shown in FIG. 10. This holder 57, in turn, is received so as to be rotatable about the vertical axis 55 in a receptacle 59 that is fixedly connected to the floor element 9. However, other configurations for holding the rollers are also conceivable.

The effect achieved by the fact that the rollers 51 are rotatable about the vertical axis 55 is that the freight carrier 7 can be pushed in any direction over the floor surface of a cargo hold 3 of an aircraft 1 and can therefore also be positioned at a desired location without the freight carrier 7 offering a great resistance to such a movement. The rotatability of the rollers 51 about the vertical axis 55 allows the rollers 51 to quickly align themselves in the desired manner.

In this context, it has proven to be advantageous if the rollers 51, as shown in FIG. 11 as a preferred embodiment of the rollers 51, have at least one helically circumferential groove 61 in the outer surface. In such a configuration, the rollers 51 align themselves very quickly by pivoting about the vertical axis 55 such that the axis of rotation 53 runs perpendicular to the direction of movement of the freight carrier and the rollers 51 offer the least possible resistance to such a movement.

A freight carrier 7 equipped with rollers 51, as shown in the exemplary embodiment of FIGS. 9 to 11, can be easily moved along the floor surface of a cargo hold without the need for a cargo loading system or the freight carrier 7 being complicated in design. In addition, it is also conceivable for the floor element 9 to be configured as a flexible, in particular bendable, floor panel.

Figure 12:
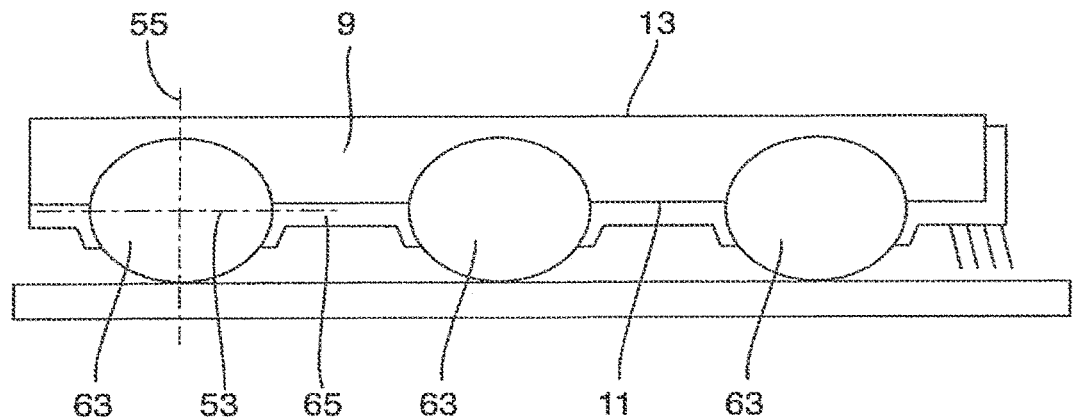
FIG. 12 is a cross-sectional view of the floor element of a freight carrier of a further exemplary embodiment.

A further alternative for a means for achieving the slidability of a freight carrier 7 on the floor of a cargo hold 3 is shown in FIG. 12. There, the floor element 9 of the freight carrier 7 is reproduced in cross section, and it can be seen that, in the alternative shown there, rolling elements are configured as balls 63. These are freely rotatably accommodated in a holder 65, which is provided on the resting surface 11 on the floor element 9, such that the axis of rotation 53, about which the ball rotates, when the freight carrier 7, the floor element 9 of which is illustrated in FIG. 12, is pushed over a floor surface, can align itself as desired. The freely rotatable balls 63 are accommodated in the holder 65 such that a portion of the balls 63 extends out of the holder 65 toward the floor surface.

Since the balls 63 are freely rotatably accommodated in the holder 65, it is ensured that, on the one hand, each ball 63 is rotatable about an axis of rotation which is aligned in such a way that a line parallel to the axis of rotation extending through the contact point between the ball 63 and the floor surface runs parallel to the floor plane. On the other hand, the balls 63 are also held on the floor element 9 in such a way that their axis of rotation is rotatable about a vertical axis which is aligned in such a way that it runs parallel to an axis which is perpendicular to the floor plane at the contact point between the ball and the floor surface.

The design of the exemplary embodiment shown in FIG. 12 with the freely rotatably accommodated balls 63 also makes it possible here for the freight carrier 7 to be able to be pushed easily in any direction over a flat floor surface.

A further advantage of the alternatives for means for enabling the slidability that are shown in FIGS. 9 to 12 and described in relation thereto is that the rolling elements, i.e., the rollers 51 and the balls 63, protrude only to a small extent above the plane of the resting surface 11 which faces the floor surface. The rolling elements can sink into the elastic material of a conveyor belt by this small extent, such that, when the freight carrier 7 rests on a conveyor belt according to these exemplary embodiments, the resting surface 11 rests directly on the conveyor belt. This in turn has the advantage that the freight carriers 7 can then no longer roll on the conveyor belt and a movement relative thereto is prevented.

Figure 13:
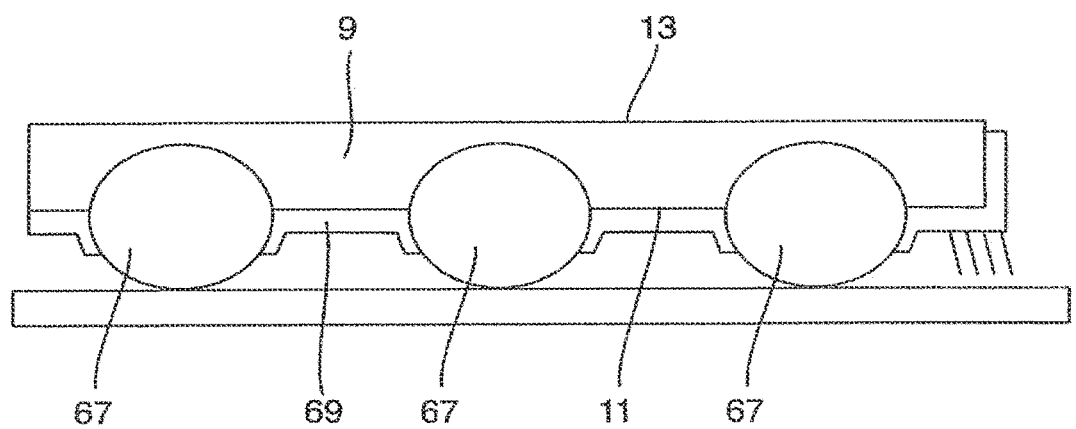
FIG. 13 is a cross-sectional view of the floor element of a freight carrier of a further exemplary embodiment.

FIG. 13 shows the cross section of the floor element 9 of a freight carrier 7 according to the invention with a further alternative of a means for enabling the slidability over the floor of a cargo hold 3. In this case, the floor element 9 can be designed in the way that has been explained in connection with the exemplary embodiments described previously. In this alternative, the resting surface 11 is provided with sliding elements 67 which are held by a holder 69 on the resting surface 11 and which enable the freight carrier 7 to be displaced over the floor surface of a cargo hold 3. The material of the sliding elements 67 can be selected in such a way that it has a low coefficient of friction in relation to the material of the floor surface of the cargo hold of an aircraft.

In particular, the sliding elements 67 can be designed in such a way that use is made of a pair of materials, i.e., the material of the sliding elements 67 combined with that of the surface of the floor of the cargo hold 3, on which the sliding elements slide, and in which surface there is a low coefficient of friction.

In the preferred alternative shown here, the sliding elements 67 are held on the resting surface 11 in a releasable and thus easily exchangeable manner by the fact that the holder 69 can be released from the floor element 9 and the sliding elements 67 can thereby be released.

In particular, felt or polytetrafluoroethylene (PTFE; "Teflon") can be selected as the material for the sliding elements 67. Furthermore, it is possible for the floor of the cargo hold 3 of the aircraft 1 to be provided with strips of a material, which together with the sliding elements 67 leads to a low coefficient of friction, in the regions in which the freight carriers 7 are to be moved with the sliding elements 67. This also makes it possible that, in the event of wear at the strips due to the friction with the sliding elements 67, it is possible only to replace the strips, and there is no wear on the floor itself Thus, even with this alternative of a means for enabling the slidability, the freight carrier 7 can be easily slid over the floor surface of a cargo hold 3 of an aircraft without the floor surface of the cargo hold 3 or the resting surface of the freight carrier 7 having to be provided with complicated arrangements.

In addition to the previously explained alternatives of means for enabling the slidability of the freight carrier over a floor surface of a cargo hold 3, other possibilities are also conceivable, and the present invention is not limited to the alternatives described previously.

Figure 14:
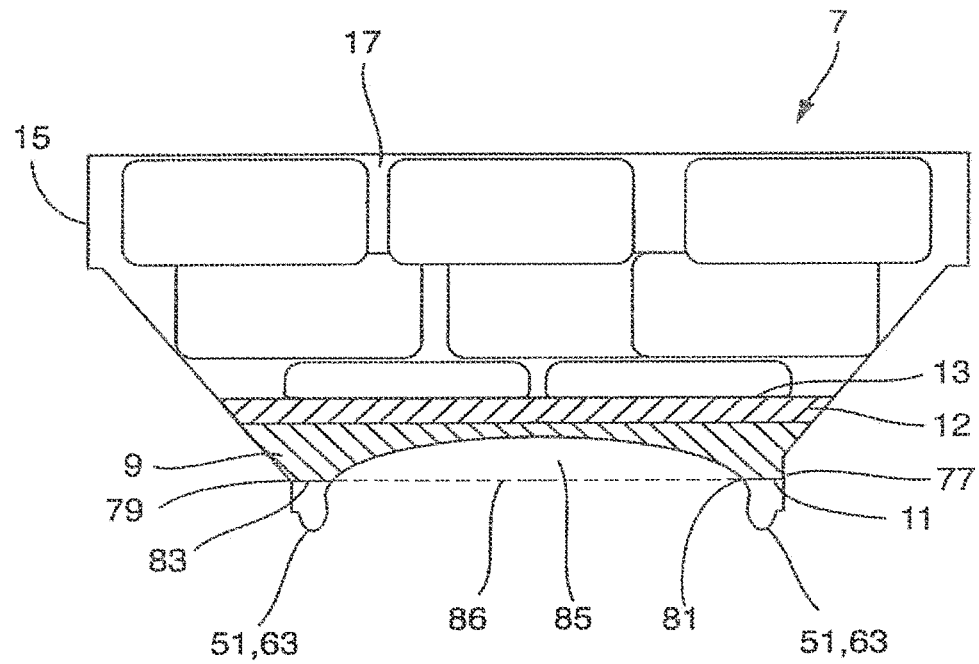
FIG. 14 is a cross-sectional view of a further exemplary embodiment of a freight carrier.
Figure 15:
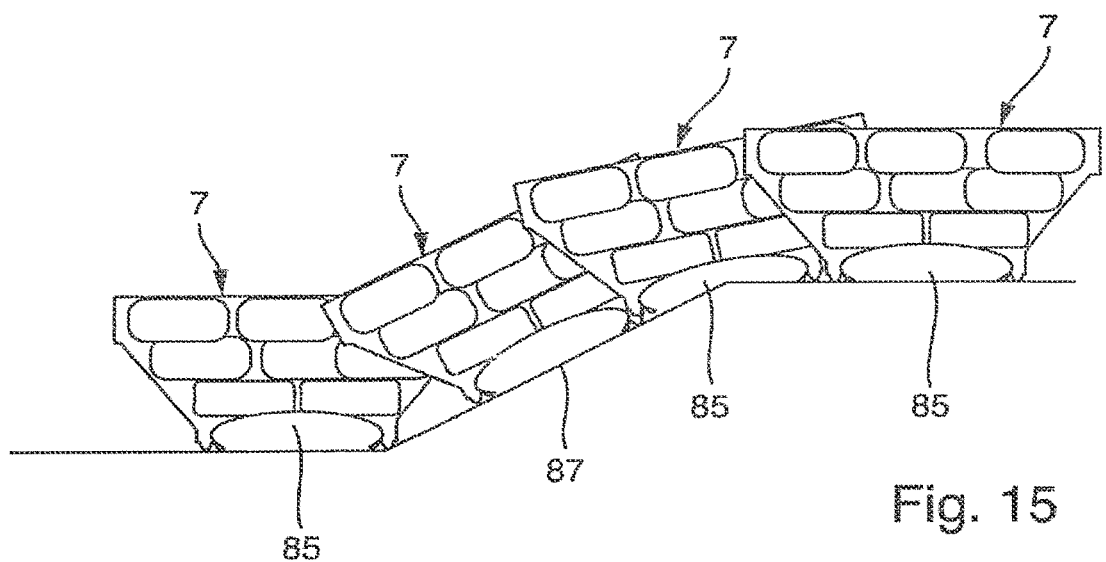
FIG. 15 is a cross-sectional view of a plurality of freight carriers according to the exemplary embodiment from FIG. 14.

FIGS. 14 and 15 illustrate a further exemplary embodiment of a freight carrier 7 according to the invention. As in the exemplary embodiments which are illustrated in FIGS. 2 to 13, the freight carrier 7 illustrated in FIG. 14 also has a floor element 9 which is provided with a resting surface 11 which, with means provided thereon, can rest on the floor surface of a cargo hold 3 of an aircraft 1 and can be moved over the floor surface. In this exemplary embodiment, the floor element 9 is configured as a rigid floor panel, although it is also possible for the floor element 9 to be flexible or to have segments which are pivotably interconnected.

In the exemplary embodiment illustrated in FIGS. 14 and 15, the means with which the freight carrier 7 can be slid over the floor surface are designed as rolling elements, as have already been described in connection with FIGS. 9 to 12. The means for enabling the slidability can therefore be designed, in particular, as rollers 51 or balls 63. However, it is also possible that, in the exemplary embodiment shown in FIGS. 14 and 15, the other previously described alternatives for means for enabling the slidability, namely recesses 19 in the resting surface 11 through which air can flow out, or sliding elements 67, are provided. In addition, it is also possible in this exemplary embodiment that, in a departure from the alternatives described here, other means for achieving the slidability over a floor surface of a cargo hold are provided on the resting surface 11.

Furthermore, in the exemplary embodiment of FIGS. 14 and 15, a base element 12 is provided on the floor element 9, on the side facing away from the resting surface 11, which base element 12 is fixedly connected here to the floor element 9 and is in particular formed integrally therewith. The base element 12 in turn has a base surface 13 which is arranged on the base element 12 in such a way that it faces away from the resting surface 11. Freight elements can be stored on the base surface 13, the base surface 13 also being able to be specially adapted to specific types of freight elements. In the present exemplary embodiment, however, it is designed as a flat surface.

It can also be seen in FIG. 14 that the floor element 9 has a front edge 77 and a rear edge 79. The resting surface 11 furthermore has a front section 81 and a rear section 83. The front section 81 is arranged here in the region of the front edge 77, while the rear section 83 is arranged in the region of the rear edge 79, with the sections 81, 83 each extending away from the edges 77, 79 in the exemplary embodiment described here.

As can also be seen in FIG. 14, the means for enabling the slidability over the floor surface of a cargo hold 3 in this exemplary embodiment, i.e. the rolling elements in the form of rollers 51 or balls 63, are attached to the front section 81 and to the rear section 83.

It can also be seen in FIG. 14 that the floor element 9 has a recess 85 which extends between the front section 81 and the rear section 83 toward the base surface 13 into the floor element 9. In particular, the recess 85 is configured in such a way that it extends into the floor element 9 over a plane 86 which extends between the front section 81 and the rear section 83 and connects them to one another.

Finally, the freight carrier 7 according to the exemplary embodiment from FIGS. 14 and 15 is also provided with a wall element 15 which surrounds a receiving space 17 and extends away from the border of the floor element 9 and the base element 12. Freight elements can be received in the receiving space 17 that extends away from the base surface 13. It is also possible in this exemplary embodiment for the wall element 15 to be formed from rigid and stiff or flexible material.

As can be seen from FIG. 15, the exemplary embodiment of the freight carrier 7 from FIG. 14 is associated with the advantage that the freight carrier 7 can be conveyed along an inclined transport plane 87 to the plane in which the floor surface of the cargo hold 3 of an aircraft 1 extends, wherein the freight carrier 7 can pivot promptly during the transition from the transport plane 87, which is formed, for example, by a conveyor belt, toward the plane of the cargo hold 3, and does not tip out of the plane 87 of the conveyor belt into the plane of the floor of the cargo hold 3. Rather, during the transition of the freight carrier 7 from the conveyor belt onto the floor of the cargo hold 3, the front section 81 can promptly rest on the floor of the cargo hold 3 while the rear section 83 is still resting on the conveyor belt, this being made possible by the upper end of the conveyor belt being received in the meantime in the recess 85.

Figure 16:
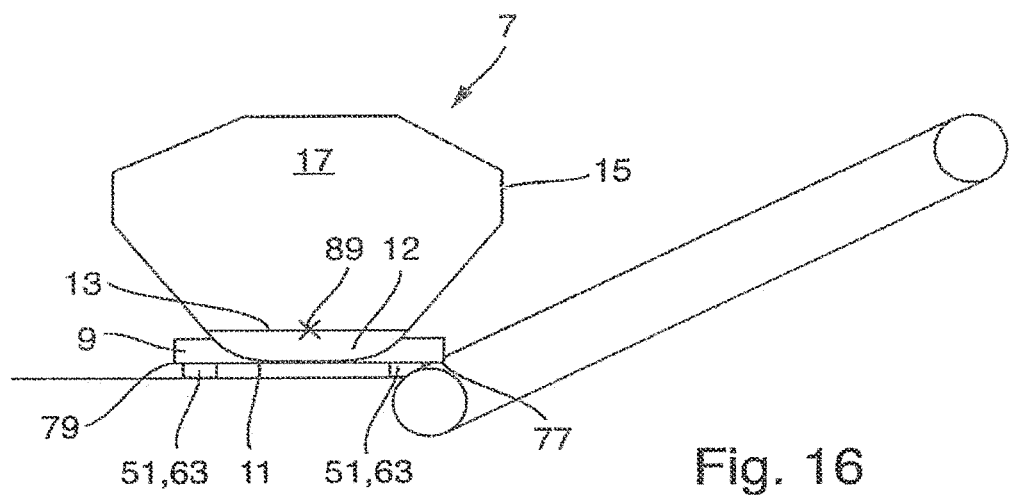
FIG. 16 is a cross-sectional view of a further exemplary embodiment of a freight carrier.
Figure 17:
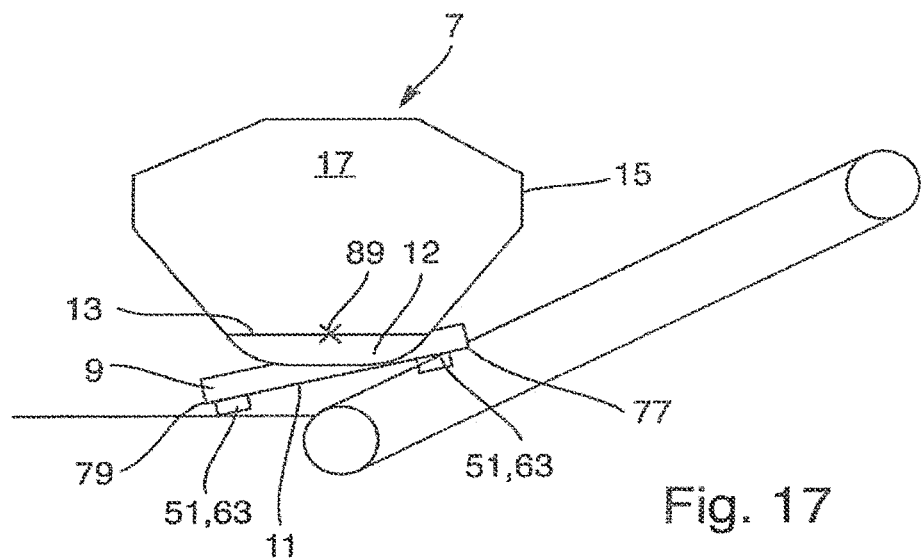
FIG. 17 shows the freight carrier from FIG. 16 in an inclined position.

A further exemplary embodiment of a freight carrier 7 according to the invention is shown in FIGS. 16 and 17, in which the base element 12, which has the floor element 9, can be pivoted relative to the latter.

As in the exemplary embodiments according to FIGS. 2 to 15, the freight carrier 7 shown in FIGS. 16 and 17 also has a floor element 9 with a resting surface 11 which extends between a front edge 77 and a rear edge 79 and which can rest via means provided thereon on the floor surface of a cargo hold 3 of an aircraft 1 and can be moved over the floor surface. In this exemplary embodiment, too, the floor element 9 is designed as a rigid floor panel, although it is also possible for the floor element 9 to be flexible or to have segments that are pivotably interconnected.

In the exemplary embodiment shown in FIGS. 16 and 17, too, these means for enabling the freight carrier 7 to be slid over the floor surface are designed as rolling elements, as have already been described in connection with FIGS. 9 to 12. The means for enabling the slidability can therefore be designed in particular as rollers 51 or balls 63.

However, it is also possible that, in the exemplary embodiment shown in FIGS. 16 and 17, other previously described alternatives for means for enabling the slidability, namely recesses 19 in the resting surface 11 through which air can flow out, or sliding elements 67, are provided. In addition, it is also possible in this exemplary embodiment that, in a departure from the alternatives described here, other means for achieving the slidability over a floor surface of a cargo hold are provided on the resting surface 11.

Furthermore, in the exemplary embodiment of FIGS. 16 and 17, a base element 12 is provided on the floor element 9, on the side facing away from the resting surface 11. The base element 12 in turn has a base surface 13 which is arranged on the base element 12 in such a way that it faces away from the resting surface 11. Freight elements can be stored on the base surface 13, the base surface 13 also being able to be specially adapted to specific types of freight elements. In the present exemplary embodiment, however, it is designed as a flat surface.

In contrast to the previously explained exemplary embodiments, in the exemplary embodiment according to FIGS. 16 and 17, the base element 12 is held on the floor element 9 in such a way that it is possible to change the angle which the base surface 13 assumes relative to the resting surface 11 in a plane which runs perpendicularly to the resting surface 11 and in which a connecting line running in the longitudinal direction of the freight carrier 7 extends between the front edge 77 and the rear edge 79. In FIGS. 16 and 17, this plane extends in the plane of the drawing and the base element 12 with the base surface 13 provided thereon can be pivoted relative to the floor element 9 about a pivot axis 89 running perpendicular to the plane of the drawing and also perpendicular to the longitudinal direction of the freight carrier 7.

Finally, the freight carrier 7 according to the exemplary embodiment from FIGS. 16 and 17 has a wall element 15 which surrounds a receiving space 17 for freight elements, the receiving space extending away from the base surface 13. The wall element 15 extends away from the border of the base element 12 and can be formed from rigid and stiff or flexible material.

The effect achieved by the pivotability of the base element 12 and of the associated base surface 13 relative to the floor element 9 is that the base surface 13 always extends in a horizontal plane, regardless of the inclination of the floor on which the resting surface 11 rests. In particular if the freight carrier 7 is transported on an inclined conveyor belt, as is shown in FIG. 17, and the transport direction coincides with the connecting line between the front and rear edges, the inclination can be easily compensated for in this way, and cargo on the freight carrier 7 is prevented from slipping due to the inclination.

Figure 18:
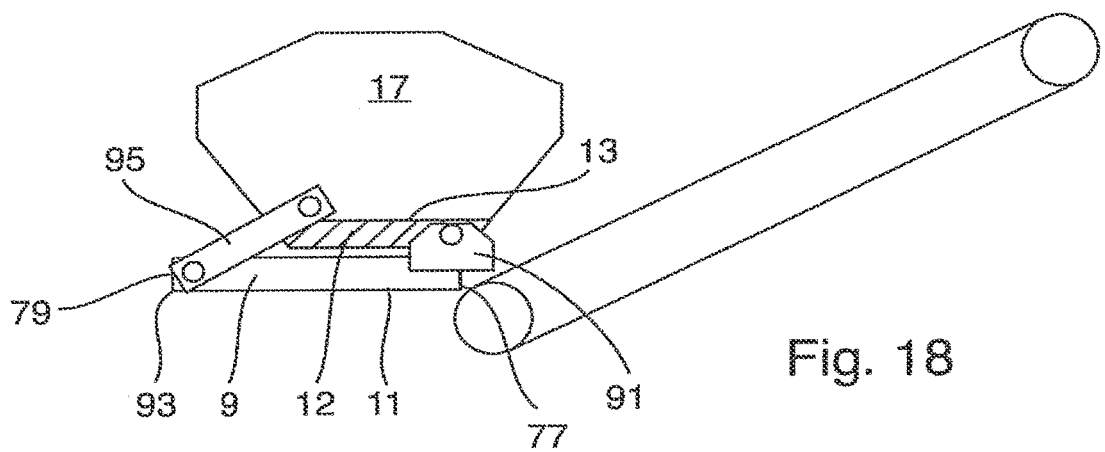
FIG. 18 is a cross-sectional view of a further exemplary embodiment of a freight carrier.
Figure 19:
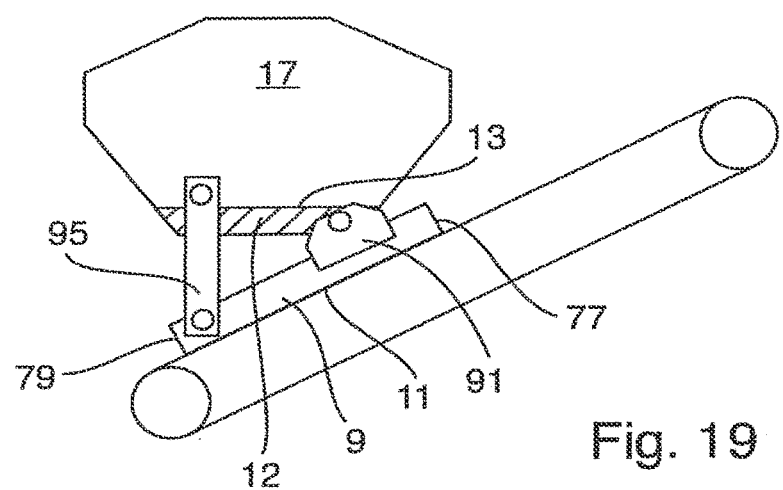
FIG. 19 shows the freight carrier from FIG. 18 in an inclined position.

FIGS. 18 and 19 show an exemplary embodiment of a freight carrier 7 that is similar to the exemplary embodiment of FIGS. 16 and 17.

In this exemplary embodiment, too, the freight carrier 7 comprises a floor element 9 with a resting surface 11, on which in turn means are provided for enabling the floor element 9 to be slid over a floor surface, such as roller elements (not shown). However, it is also possible for other alternatives of such means, already explained, to be provided.

In addition, the floor element 9 also has a front edge 77 and a rear edge 79 in this exemplary embodiment, with a forward section 91 and a rearward section 93 being provided on the floor element 9. The forward section 91 is arranged here in the region of the front edge 77 and can be slid relative to the rest of the floor element 9 in the longitudinal direction thereof. The rearward section 93 is provided in the region of the rear edge 79. Furthermore, in this exemplary embodiment, the rearward section 93 of the floor element 9 is connected to the base element 12 via a lever arm 95. However, the lever arm 95 is coupled pivotably, but non-displaceably, both to the rearward section 93 of the floor element 9 and to the base element 12. The forward section 91, which is displaceable in relation to the floor element 9 in the longitudinal direction thereof extending from the front edge 77 to the rear edge 79 is also coupled to the base element 12 in a non-displaceable but pivotable manner. The pivot axes about which the lever arm 95 can pivot relative to the rearward section 93 of the floor element 9 and relative to the base element 12, and the pivot axis about which the forward section 91 can pivot relative to the base element 12 all run parallel to one another and also extend perpendicular to the longitudinal direction of the floor element 9.

As a comparison of FIGS. 18 and 19 shows, the base element 12 with the base surface 13 provided thereon and freight elements located thereon can simply be pivoted in such a way that the forward section 91 is displaced relative to the floor element 9 toward the rearward section 93 or the rear edge 79. The advantages explained in connection with the exemplary embodiment shown in FIGS. 16 and 17 can thus also be achieved with this exemplary embodiment, but a simple and nevertheless stable structure is realized here.

Also in the exemplary embodiment shown in FIGS. 18 and 19, the freight carrier 7 has a wall element 15 which surrounds a receiving space 17 for freight elements, which receiving space extends away from the base surface 13. The wall element 15 extends away from the border of the base element 12 and can be formed from rigid and stiff or flexible material.

According to a further preferred embodiment of the present invention, which is shown in FIGS. 20 to 23, the freight carrier 7 can be designed in such a way that one or more wheelchairs 97 can be received in the receiving space 17 extending from the base surface 13 of the base element 12.

In all the exemplary embodiments described above, the base element 12 and the base surface 13 can be designed and dimensioned accordingly, this being, in particular, independent of whether the floor element 9 is designed as a rigid panel or in flexible or segmented form. This is also irrespective of whether the floor element 9 and the base element 12 are fixedly interconnected or are pivotable with respect to one another. Finally, the design of the means for achieving the slidability of the freight carrier 7 relative to a floor surface is not important either. In all cases, the receiving space 17 of the freight carrier 7 can be designed for wheelchairs.

In the exemplary embodiment of a freight carrier 7 that is shown in FIGS. 20 to 23, the floor element 9 has a base element 12, away from the base surface 13 of which the receiving space 17, in which the wheelchairs 97 can be received, extends. The base element 12 in the exemplary embodiment shown here is fixedly connected to the floor element 9 or is even formed integrally therewith.

In this exemplary embodiment, the floor element 9 has a recess 85 in the middle, similar to the exemplary embodiment shown in FIGS. 14 and 15. Here, too, the resting surface 11 has a front section 81 and a rear section 83. In this case, the front section 81 is arranged in the region of the front edge 77, while the rear section 83 is arranged in the region of the rear edge 79. Furthermore, the sections 81, 83 in the exemplary embodiment described here from FIGS. 20 to 23 extend away from the edges 77, 79, respectively. The recess 85 is then configured in such a way that it extends into the floor element 9 over a plane 86 which extends between the front section 81 and the rear section 83 and connects them to one another.

Figure 20:
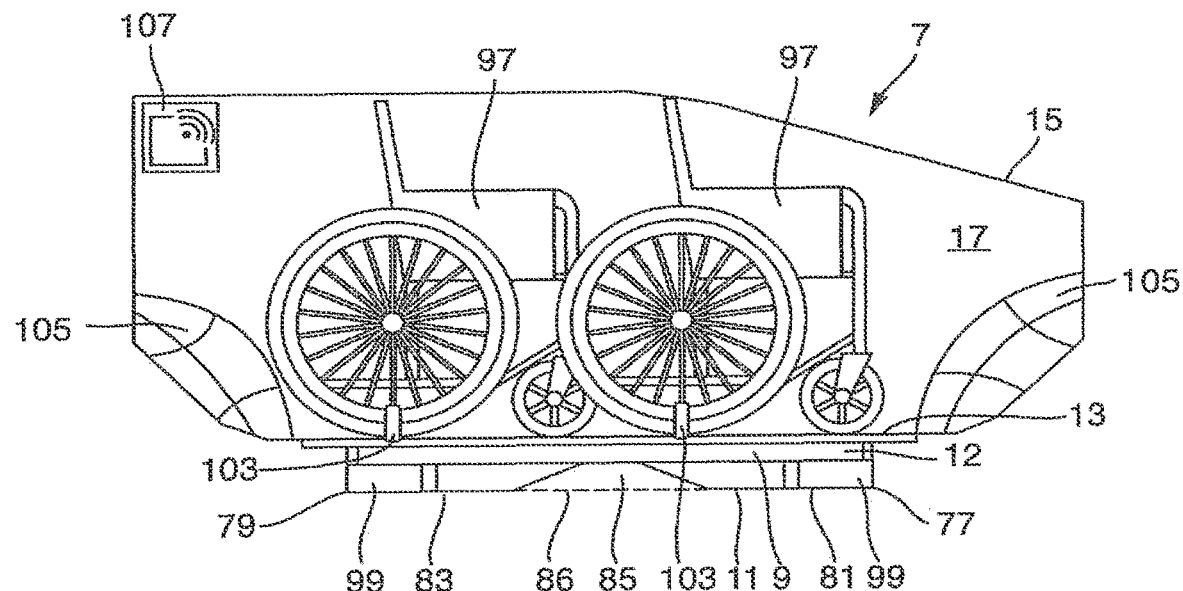
FIG. 20 is a cross-sectional view of a further exemplary embodiment of a freight carrier.
Figure 21:
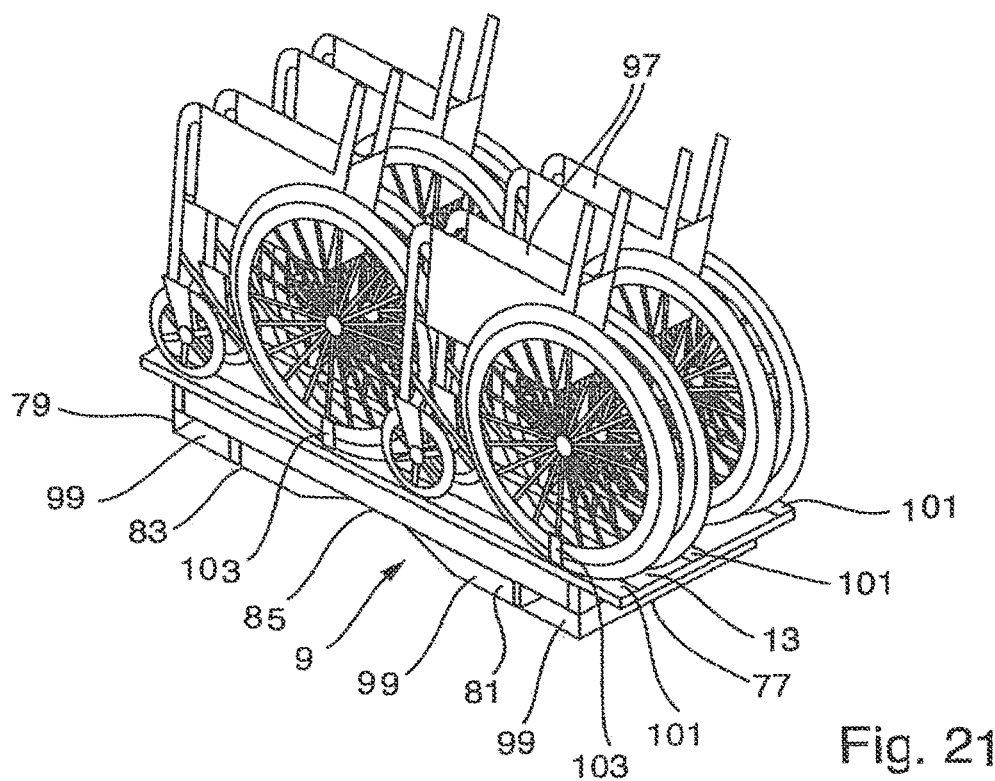
FIG. 21 is a perspective illustration of part of the exemplary embodiment from FIG. 20.

Furthermore, the floor element 9 in the exemplary embodiment shown in FIGS. 20 to 23 has first and second shafts 99 which extend parallel to one another in the floor element 9 and also parallel to the resting surface 11. The shafts 99 are designed to receive the forks of a forklift truck such that the floor element 9 and thus the freight carrier 7 can be easily picked up and transported by a forklift truck. Such shafts 99 can also be provided in the other exemplary embodiments described in this application. In FIGS. 20 and 21 it is shown that the floor element 9 and the base surface 13 provided thereon is dimensioned and designed in such a way that two rows arranged next to one another and consisting in each case of two folded-up wheelchairs 97 can be disposed thereon (see FIG. 21).

In particular, guide elements 101, such as rails, which hold the folded-up wheelchairs 97 in position, can be provided in the region of the base surface 13. Furthermore, fastening elements 103 in the form of straps which are adapted to fix the wheels of the wheelchairs 97 to the base surface 13 are provided on the base surface 13. In addition, as shown only in FIG. 20, expandable elements such as inflatable cushion elements 105 are provided on the front wall, the rear wall and/or the side walls which form the wall element 15 of the freight carrier 7. The latter also serve to fix the wheelchairs 97 within the receiving space 17.

In the exemplary embodiment of the freight carrier 7 intended for receiving wheelchairs 97, shown in FIGS. 20 to 23, the freight carrier 7 can have data transmission means 107, for example in the form of a transmitting/receiving device, with which data regarding the wheelchairs 97 received, in particular information identifying the wheelchairs 97 individually, can be transmitted, preferably wirelessly, to a data network of the aircraft 1 in which the freight carrier 7 with the wheelchairs 97 is located. This is shown schematically likewise only in FIG. 20.

Figure 22:
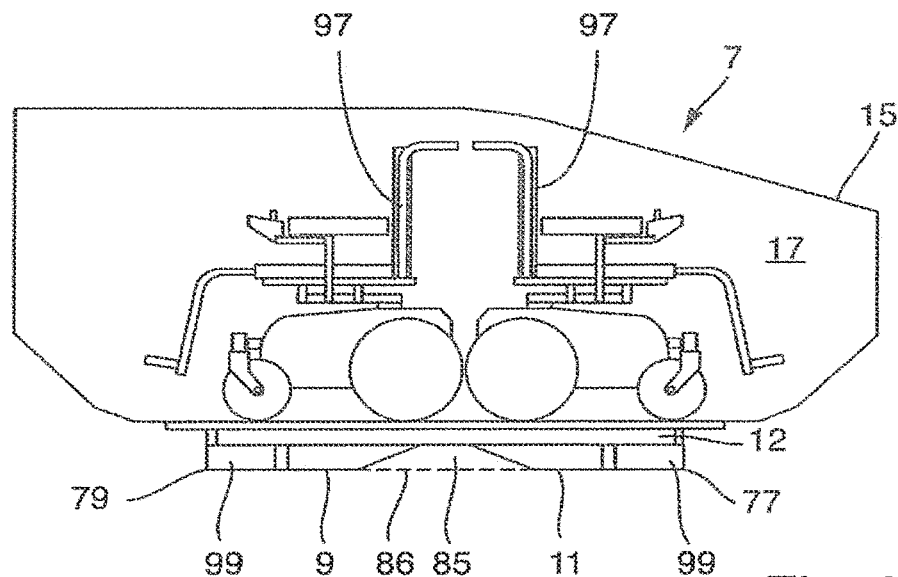
FIG. 22 is a further cross-sectional view of the exemplary embodiment from FIG. 20.
Figure 23:
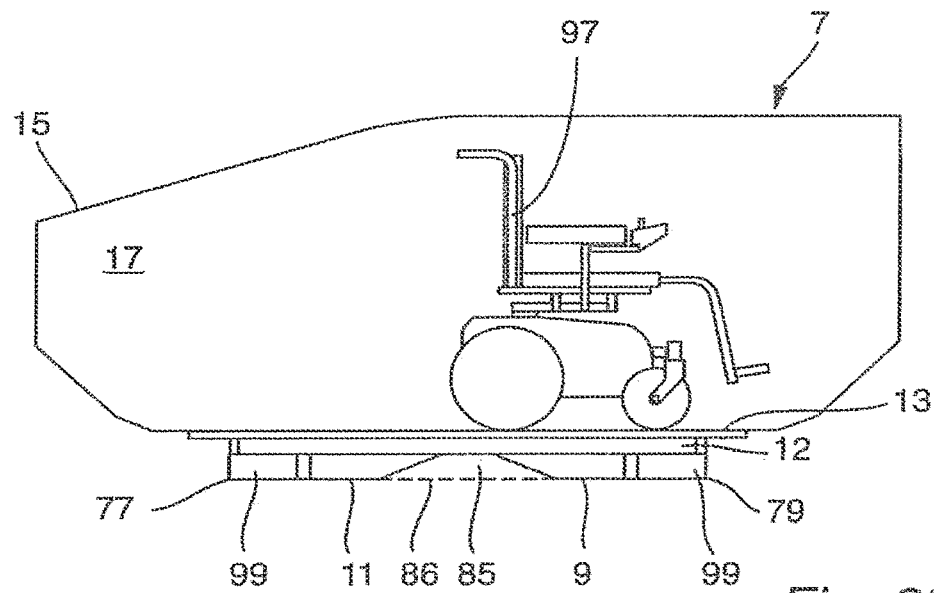
FIG. 23 is a further cross-sectional view of the exemplary embodiment from FIG. 20.

FIG. 22 also shows that the floor element 9 with the base surface 13 formed thereon is furthermore designed and dimensioned such that two wheelchairs provided with a drive can be mounted one behind the other on the base surface 13. Finally, FIG. 23 shows that also only one single wheelchair 97 provided with a drive can be received on the base surface 13.

As shown in FIGS. 20 to 23, the wall element 15 of a freight carrier 7, which is designed to receive wheelchairs 97, is preferably configured such that it comprises a front wall, a rear wall and side walls extending between the front wall and the rear wall, wherein the front wall, the rear wall and the side walls are designed to be rigid and dimensionally stable.

It is particularly advantageous here if the floor element 9 and/or the base element 12, the front wall, the rear wall and/or the side wall are made of heat-resistant and/or fire-resistant material. This is particularly relevant because wheelchairs 97 often have batteries for the drive, which may catch fire, and therefore transporting wheelchairs 97 in the cargo hold 3 of an aircraft 1 represents an increased risk.

The freight carrier 7 for transporting wheelchairs 97 is therefore preferably designed in such a way that it withstands a fire in the energy store of the wheelchair 97 over the necessary operating time of the aircraft in which the freight carrier 7 is received. This is ensured by the fact that the burn-through protection of the freight carrier 7 is maintained. The burn-through protection of the freight carrier 7 is ensured by a suitable design of the material of the wall element 15 and/or of the floor element 9 and/or of the base element 12, for example by applying an intumescent layer to the inside of the wall 15, which in the event of a fire forms a burn-through-proof layer. Instead of an intumescent layer, a substance can also be used in the receiving space, which in the event of a fire leads to glazing and thus represents a thermal barrier to the surroundings of the freight carrier 7, comparable to the transport boxes for damaged lithium batteries in electric cars. It is also possible to provide the freight carrier 7 with a burn-through-proof cover that is fixed to the outer surface of the freight carrier 7. The material of the floor element 9 and/or the base element 12 and/or the wall element 15 itself can also be designed to be burn-through-proof in such a way that it withstands a fire in the energy carrier that lasts over the operating time of the aircraft.

Furthermore, the freight carrier 7 can have means which prevent an uncontrolled increase in pressure in its receiving space 17 as a result of a thermal process within the battery of a wheelchair, in that pressure is equalized before the freight carrier 7 bursts. The pressure inside the freight carrier 7 can be reduced by conducting the accumulated gas into the cargo hold of the aircraft. Likewise, the freight carrier 7 can have the option of conducting the accumulated gas out of the aircraft via suitable couplings. The freight carrier 7 can also be equipped with an active fire suppression system in the receiving space 17, in particular with a suitable possibility of detecting a fire in the battery of the wheelchair 97 and a suitable means of fire suppression.

Figure 24:
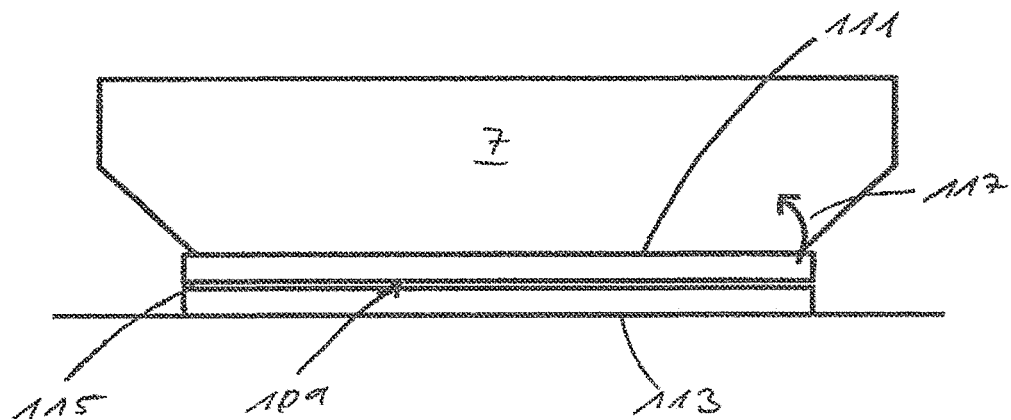
FIG. 24 is a side view of a combination of two freight carriers according to exemplary embodiments of the present invention with a receiving platform.
Figure 25:
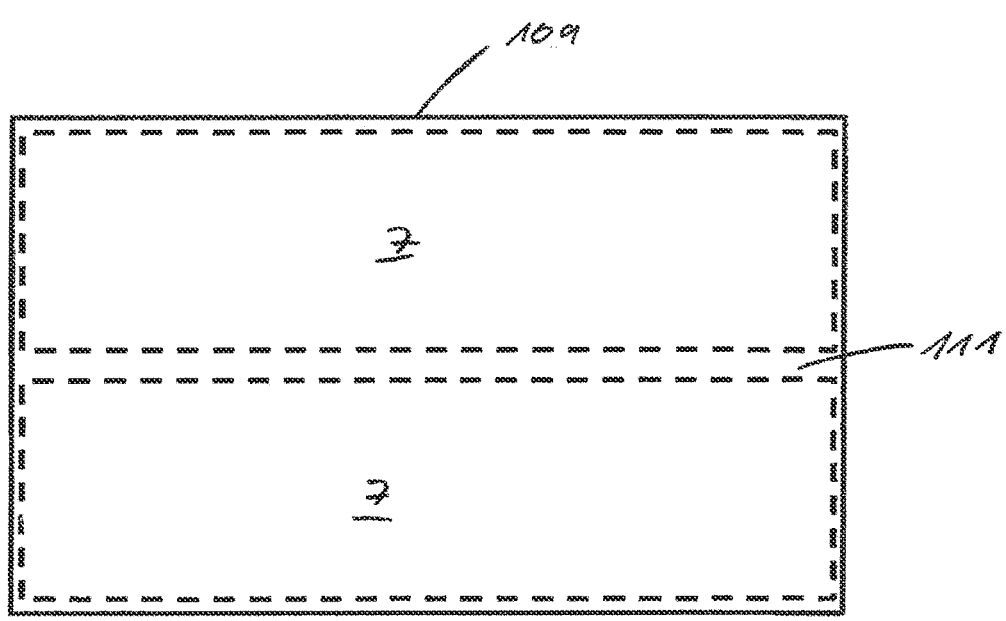
FIG. 25 is a plan view of the combination from FIG. 24.

Finally, FIGS. 24 and 25 show an exemplary embodiment according to the invention of a system consisting of a plurality of freight carriers 7 according to one of the exemplary embodiments described previously and a receiving platform 109, the receiving platform 109 having a receiving surface 111 and a floor 113.

The base 113 is designed to rest on a floor surface of a cargo hold 3 of an aircraft 1, while the receiving surface 111 is dimensioned and designed to receive one or more of the freight carriers 7 described with the resting surfaces 11 thereof in such a way that the resting surfaces 11 rest on the receiving surface 111. As can be seen from the plan view in FIG. 22, the receiving surface 109 in the exemplary embodiment shown here is dimensioned such that two freight carriers 7 can be received next to one another with their side surfaces opposite one another.

It is also possible for the base 113 of the receiving platform 109 to have the same dimensions as the base surface of a type of container frequently used for air freight. For example, the floor can have the dimensions of the floor of an LD-3 container. With such a configuration, the system of freight carriers 7 and a receiving platform 109 can be loaded together with conventional air freight containers into cargo holds that are designed for the conventional containers.

Similarly to the exemplary embodiments from FIGS. 16 to 19, the receiving platform 109 according to the exemplary embodiment described here is designed such that the part with the receiving surface 111 can be pivoted about a pivot axis 115 in the direction of the arrow 117 in relation to the part with the base 113. In this way it can be ensured that, when the receiving platform 109 is transported along an inclined plane such as a conveyor belt, the freight carriers 7 are nevertheless arranged horizontally.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Aircraft
3 Cargo hold
5 Loading hatch
7 Freight carrier
9 Floor element
11 Resting surface
12 Base element
13 Base surface
15 Wall element
17 Receiving space
19 Recesses
21 Base
23 Outlet opening
25 Line arrangement
27 Connection
29 Line element
30 Sealing element
31 Floor holding element
33 Peripheral edge
35 Wall holding element
37 Connection element
39 Holding element
41 Blower unit
43 Blower
45 Output
47 Flexible hose
49 Carrying strap arrangement
51 Rolls
53 Axis of rotation
55 Vertical axis
57 Holder
59 Receptacle
61 Groove
63 Balls
65 Holder
67 Sliding elements
69 Holder
71 Annular element; belt
71' Annular element section 73 Guide
75 Bearing element
77 Front edge
79 Rear edge
81 Front section
83 Rear section
85 Recess
86 Plane
87 Transport plane
89 Pivot axis
91 Forward section
93 Rearward section
95 Lever arm
97 Wheelchair
99 Shaft
101 Guide element
103 Fastening element
105 Cushion element
107 Data transmission means
109 Receiving platform
111 Receiving surface
113 Base
115 Pivot axis
117 Arrow

The invention claimed is:

1. A freight carrier configured to be received in a cargo hold of an aircraft, with a floor element, the freight carrier comprising:
a resting surface configured to rest on a floor surface of a cargo hold of the aircraft,
wherein the freight carrier is configured to be moved with the resting surface over the floor surface extending in a floor plane,
wherein the floor element has a base element with a base surface, the base surface being arranged on the base element such that the base surface faces away from the resting surface,
wherein the resting surface is provided with means which are configured to enable the freight carrier to be slid over the floor surface,
wherein the floor element is configured as a rigid floor panel,
wherein the floor element has a front edge and a rear edge,
wherein the resting surface has a front section and a rear section,
wherein the front section is arranged in a region of the front edge and the rear section is arranged in a region of the rear edge, and
wherein the floor element has a recess which extends between the front section and the rear section toward the base surface,
wherein the recess is configured such that the recess extends from a first portion of the resting surface located at the front section to a second portion of the resting surface located at the rear section, and the resting surface is interrupted in a region of the recess.

2. The freight carrier as claimed in claim 1, wherein the base element is fixedly connected to the floor element.

3. The freight carrier as claimed in claim 1,
wherein the freight carrier has a receiving space extending away from the base surface, and
wherein planar separating elements which divide the receiving space into subsections and extend away from the base surface are provided within the receiving space.

4. The freight carrier as claimed in claim 1,
wherein the freight carrier has a front wall, a rear wall and side walls extending between the front wall and the rear wall, and
wherein connecting elements for a releasable connection to another freight carrier are provided in at least one of the region of the side walls or the region of the front wall and rear wall.

5. The freight carrier as claimed in claim 1,
wherein receiving elements are provided for receiving forks of a forklift truck.

6. The freight carrier as claimed in claim 1,
wherein the freight carrier has a front wall, a rear wall and side walls extending between the front wall and the rear wall, and
wherein the front wall, the rear wall and the side walls are configured to be rigid and dimensionally stable.

7. The freight carrier as claimed in claim 6, wherein at least one of the front wall, the rear wall, or the side wall are formed from at least one of a heat-resistant or fire-resistant material.

8. The freight carrier as claimed in claim 6, wherein expandable elements such as inflatable cushion elements are provided on at least one of the front wall, the rear wall or the side walls.

9. The freight carrier as claimed in claim 1,
wherein the freight carrier is configured to receive one or more wheelchairs,
wherein the freight carrier has data transmission means with which data regarding wheelchairs received can be transmitted to a data network of an aircraft.

10. A system comprising:
one or more freight carriers as claimed in claim 1, and
a receiving platform,
wherein the receiving platform has a receiving surface and a receiving platform floor which is configured to rest on the floor surface of the cargo hold of the aircraft,
wherein the receiving surface is dimensioned and configured to receive one or more of the freight carriers by way of the resting surface thereof.

11. The system as claimed in claim 10, wherein the receiving surface is configured and dimensioned such that two freight carriers can be received next to one another.

12. The system as claimed in claim 10, wherein the receiving platform is configured such that the receiving surface can be pivoted relative to the receiving platform floor.

13. A receiving platform for a system as claimed in claim 10,
wherein the receiving platform has a receiving surface and the receiving platform floor which is configured to rest on the floor surface of the cargo hold of the aircraft,
wherein the receiving surface is dimensioned and configured to receive one or more of the freight carriers by way of the resting surface thereof.

14. The receiving platform as claimed in claim 13, wherein the receiving surface is configured and dimensioned such that two freight carriers can be received next to one another.

15. The receiving platform as claimed in claim 13, wherein the receiving platform is configured such that the receiving surface can be pivoted relative to the receiving platform floor.

16. A freight carrier configured to be received in a cargo hold of an aircraft, with a floor element, the freight carrier comprising:
a resting surface configured to rest on a floor surface of a cargo hold of the aircraft, wherein the freight carrier is configured to be moved with the resting surface over the floor surface extending in a floor plane, wherein the floor element has a base element with a base surface, the base surface being arranged on the base element such that the base surface faces away from the resting surface, wherein the resting surface is provided with means which are configured to enable the freight carrier to be slid over the floor surface, wherein the floor element is configured as a rigid floor panel, wherein the floor element has a front edge and a rear edge, wherein the resting surface has a front section and a rear section, wherein the front section is arranged in a region of the front edge and the rear section is arranged in a region of the rear edge, and wherein the floor element has a recess which extends between the front section and the rear section toward the base surface, wherein the base element is held on the floor element such that it is possible to change an angle which the base surface assumes relative to the resting surface in a plane which runs perpendicularly to the resting surface and in which a connecting line running in a longitudinal direction of the freight carrier extends between the front edge and the rear edge.

17. The freight carrier as claimed in claim 16, wherein the base element is pivotable about a pivot axis relative to the floor element, and wherein the pivot axis is perpendicular to the connecting line and parallel to the resting surface.

18. The freight carrier as claimed in claim 16, wherein a rearward section of the floor element is connected to the base element via a lever arm, the lever arm being coupled pivotably to the base element and pivotably to the floor element, and wherein a forward section is held on the floor element to be able to be slid in the longitudinal direction of the floor element and on the base element to be pivotable.

* * * * *